（12）United States Patent
Koberstein et al.

(10) Patent No.: US 8,993,068 B2
(45) Date of Patent: Mar. 31, 2015

(54) HETEROBIFUNCTIONAL POLYMERS AND METHODS FOR LAYER-BY-LAYER CONSTRUCTION OF MULTILAYER FILMS

(75) Inventors: Jeffrey T. Koberstein, New York, NY (US); Hernan R. Rengifo, New York, NY (US); Cristian Grigoras, New York, NY (US); Jeffrey Lancaster, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 155 days.

(21) Appl. No.: 13/127,683

(22) PCT Filed: Nov. 4, 2009

(86) PCT No.: PCT/US2009/063282
§ 371 (c)(1),
(2), (4) Date: Sep. 19, 2011

(87) PCT Pub. No.: WO2010/053993
PCT Pub. Date: May 14, 2010

(65) Prior Publication Data
US 2012/0021200 A1 Jan. 26, 2012

Related U.S. Application Data

(60) Provisional application No. 61/111,222, filed on Nov. 4, 2008.

(51) Int. Cl.
*B05D 1/36* (2006.01)
*B05D 7/00* (2006.01)
*C09D 183/04* (2006.01)
(Continued)

(52) U.S. Cl.
CPC ............ *C09D 183/04* (2013.01); *C08G 77/045* (2013.01); *C08G 77/20* (2013.01)
USPC ......... 427/407.1; 427/299; 427/301; 427/302

(58) Field of Classification Search
None
See application file for complete search history.

(56) References Cited

U.S. PATENT DOCUMENTS

| 4,507,466 A | 3/1985 | Tomalia et al. |
| 4,558,120 A | 12/1985 | Tomalia et al. |
| 4,568,737 A | 2/1986 | Tomalia et al. |

(Continued)

FOREIGN PATENT DOCUMENTS

WO    WO-2010/053993    5/2010

OTHER PUBLICATIONS

Johnson et al.; Construction of Linear Polymers, Dendrimers, Networks, and Other Polymeric Architectures by Copper-Catalyzed Azide-Alkyne Cycloaddition "Click" Chemistry; Macromol. Rapid Commun.; 2008, 29, 1052-1072.*

(Continued)

*Primary Examiner* — Timothy Meeks
*Assistant Examiner* — Michael P Rodriguez
(74) *Attorney, Agent, or Firm* — Wilmer Cutler Pickering Hale and Dorr LLP

(57) ABSTRACT

In one aspect, the present invention is directed to methods for modification of functionalized substrates. In another aspect, the invention relates to systems and methods for fabricating multilayer polymer compositions. In certain embodiments, the multilayer polymer compositions described herein can comprise heterobifunctional polymers and heterotrifunctional molecules.

35 Claims, 21 Drawing Sheets

(51) Int. Cl.
C08G 77/04 (2006.01)
C08G 77/20 (2006.01)

(56) References Cited

U.S. PATENT DOCUMENTS

| | | | |
|---|---|---|---|
| 4,587,329 | A | 5/1986 | Tomalia et al. |
| 5,502,246 | A | 3/1996 | Sucholeiki |
| 5,626,863 | A | 5/1997 | Hubbell et al. |
| 5,646,302 | A | 7/1997 | Barner et al. |
| 5,844,016 | A | 12/1998 | Sawhney et al. |
| 5,858,653 | A | 1/1999 | Duran et al. |
| 6,051,248 | A | 4/2000 | Sawhney et al. |
| 6,153,211 | A | 11/2000 | Hubbell et al. |
| 6,201,065 | B1 | 3/2001 | Pathak et al. |
| 6,201,072 | B1 | 3/2001 | Rathi et al. |
| 6,465,178 | B2 | 10/2002 | Chappa et al. |
| 2003/0078314 | A1 | 4/2003 | Johnson et al. |
| 2003/0096301 | A1 | 5/2003 | Guo |
| 2003/0113792 | A1 | 6/2003 | Swan et al. |
| 2003/0153001 | A1 | 8/2003 | Soane et al. |
| 2003/0215801 | A1 | 11/2003 | Pieken et al. |
| 2004/0209317 | A1 | 10/2004 | Ting |
| 2004/0234788 | A1 | 11/2004 | Li et al. |
| 2005/0032081 | A1 | 2/2005 | Ju et al. |
| 2005/0208428 | A1 | 9/2005 | Kawamura et al. |
| 2007/0020620 | A1 | 1/2007 | Finn et al. |
| 2008/0051571 | A1 | 2/2008 | Sekine et al. |
| 2008/0207887 | A1 | 8/2008 | Lukhtanov et al. |
| 2009/0054619 | A1 | 2/2009 | Baker et al. |
| 2009/0111775 | A1 | 4/2009 | Li |
| 2010/0331441 | A1 | 12/2010 | Lancaster et al. |
| 2012/0021200 | A1 | 1/2012 | Koberstein et al. |
| 2012/0264881 | A1 | 10/2012 | Lancaster et al. |
| 2013/0171461 | A1 | 7/2013 | Dach et al. |

OTHER PUBLICATIONS

Vestberg et al.; Role of Architecture and Molecular Weight in the Formation of Tailor-Made Ultrathin Multilayers Using Dendritic Macromolecules and Click Chemistry; J. Polym. Sci., Part A: Polym. Chem.; 2007, 45, 2835-2846.*

Aucagne et al.; Chemoselective Formation of Successive Triazole Linkages in One Pot: "Click-Click" Chemistry; Org. Lett.; 2006, 8, 4505-4507.*

Such et al.; Assembly of Ultrathin Polymer Multilayer Films by Click Chemistry; J. Am. Chem. Soc.; 2006, 128, pp. 9318-9319.*

Opsteen et al.; Modular Synthesis of ABC Type Block Copolymers by "Click" Chemistry; Journal of Polymer Science: Part A: Polymer Chemistry; 2007, 45, pp. 2913-2924.*

Slater et al.; "Click Chemistry" in the Preparation of Porous Polymer-Based Particulate Stationary Phases for μ-HPLC Separation of Peptides and Proteins; Anal. Chem.; 2006, 78(14), pp. 4696-4975.*

Merrifield, R. B., "Solid Phase Peptide Synthesis. I. The Synthesis of a Tetrapeptide", J. Am. Chem. Soc., Jul. 20, 1963, vol. 85, pp. 2149-2154.

Orth, Ronald, et al., "A Photolabile Linker for the Mild and Selective Cleavage of Enriched Biomolecules from Solid Support", J. Org. Chem., 2009, vol. 74, No. 21, pp. 8476-8479.

Falsey, James R., et al., "Peptide and Small Molecule Microarray for High Throughput Cell Adhesion and Functional Assays", Bionconjugate Chem., 2001, vol. 12, pp. 346-353.

Letsinger, R. L., et al., "Reactions on Polymer Supports", Organic and Biological Chemistry, J. Am. Chem. Soc., Dec. 5, 1964, vol. 86, pp. 5163-5165.

Yang, Li, et al., "A Photocleavable and Mass Spectrometry Identifiable Cross-Linker for Protein Interaction Studies", Anal. Chem., 2010, vol. 82, pp. 3556-3566.

Fodor, Stephen P. A., et al., "Light-Directed, Spatially Addressable Parallel Chemical Synthesis", Science, Feb. 15, 1991, vol. 251, pp. 767-773.

Pease, Ann Caviani, et al., "Light-generated oligonucleotide arrays for rapid DNA sequence analysis", Proc. Natl. Acad. Sci. USA, May 1994, vol. 91, pp. 5022-5026.

Singh-Gasson, Sangeet, et al., "Maskless fabrication of light-directed oligonucleotide microarrays using a digital micromirror array", Nature Biotechnology, Oct. 1999, vol. 17, pp. 974-978.

Hartmann, Laura, et al., "Solid-Phase Supported Polymer Synthesis of Sequence-Defined, Multifunctional Poly(amidoamines)", Biomacromolecules, Apr. 2006, vol. 7, pp. 1239-1244.

MacBeath, Gavin, et al., "Printing Proteins as Microarrays for High-Throughput Function Determination", Science, Sep. 8, 2000, vol. 289, No. 5485, pp. 1760-1763.

Rusmini, Federica, et al., "Protein Immobilization Strategies for Protein Biochips", Biomacromolecules, Jun. 2007, vol. 8, No. 6, pp. 1775-1789.

Panicker, Resmi C., et al., "Recent Advances in Peptide-Based Microarray Technologies", Combinatorial Chemistry & High Throughput Screening, 2004, vol. 7, pp. 547-556.

Mei, Ying, et al., "Solid-Phase ATRP Synthesis of Peptide-Polymer Hybrids", J. Am. Chem. Soc., Mar. 24, 2004, vol. 126, No. 11, pp. 3472-3476.

Moses, John E., et al., The growing applications of click chemistry, Chem. Soc. Rev., Aug. 2007, vol. 36, No. 8, pp. 1249-1262.

Dondoni, Alessandro, "The Emergence of Thiol-Ene Coupling as a Click Process for Materials and Bioogranic Chemistry", Angew. Chem., 2008, vol. 47, pp. 8995-8997.

Hawker, Craig J., "The Convergence of Synthetic Organic and Polymer Chemistries", Science, Aug. 19, 2005, vol. 309, No. 5738, pp. 1200-1205.

Laibinis, Paul E., et al., "Comparison of the Structures and Wetting Properties of Self-Assembled Monolayers of $n$-Alkanethiols on the Coinage Metal Surfaces, Cu, Ag, Au$^{1}$", J. Am. Chem. Soc., 1991, vol. 113, pp. 7152-7167.

Johnson, Jeremiah A., et al., "Core-Clickable PEG-Branch-Azide Bivalent-Bottle-Brush Polymers by ROMP: Grafting-Through and Clicking-To", J. Am. Chem. Soc., 2011, vol. 133, No. 3, pp. 559-566.

Senaratne, Wageesha, et al., "Self-Assembled Monolayers and Polymer Brushes in Biotechnology: Current Applications and Future Perspectives", Biomacromolecules, 2005, vol. 6, No. 5, pp. 2427-2448.

Wang, Jin-Shan, et al., "Controlled/"Living" Radical Polymerization. Halogen Atom Transfer Radical Polymerization Promoted by a Cu(I)/Cu(II) Redox Process", Macromolecules, 1995, vol. 28, No. 23, pp. 7901-7910.

Johnson, Jeremiah A., et al., "Synthesis of Photocleavable Linear Macromonomers by ATRP and Star Macromonomers by a Tandem ATRP-Click Reaction: Precursors to Photodegradable Model Networks", Macromolecules, 2007, vol. 40, No. 10, pp. 3589-3598.

Antoni, Per, et al., "Pushing the Limits for Thiol-Ene and CuAAC Reactions: Synthesis of a 6th Generation Dendrimer in a Single Day", Macromolecules, 2010, vol. 43, pp. 6625-6631.

Rengifo, Hernan R., et al., ""Click-Functional" Block Copolymers Provide Precise Surface Functionality via Spin Coating", Langmuir, 2008, vol. 24, pp. 7450-7456.

Chen, Lu, et al., "Spin-On End-Functional Diblock Copolymers for Quantitative DNA Immobilization", Biomacromolecules, 2008, vol. 9, pp. 2345-2352.

Lvov, Yuri, et al., "Combination of Polycation/Polyanion Self-Assembly and Langmuir-Blodgett Transfer for the Construction of Superlattice Films", J. Phys. Chem., 1993, vol. 97, pp. 13773-13777.

Lvov, Yuri, et al., "Formation of Ultrathin Multilayer and Hydrated Gel from Montmorillonite and Linear Polycations", Langmuir, 1996, vol. 12, pp. 3038-3044.

Cooper, Thomas M., et al., "Formation of Polypeptide-Dye Multilayers by an Electrostatic Self-Assembly Technique", Langmuir, 1995, vol. 11, pp. 2713-2718.

Locklin, Jason, et al., "Nanostructured Ultrathin Films of Water-Soluble Sexithiophene Bolaform Amphiphiles Prepared by Layer-by-Layer Self-Assembly", Langmuir, 2002, vol. 18, pp. 877-883.

Zhang, Xi, et al., "Layer-by-layer assembly: from convention to unconventional methods", Chem. Commun., Apr. 14, 2007, No. 14, pp. 1395-1405.

Sukhorukov, Gleb B., et al., "Layer-by-layer self assembly of polyelectrolytes on colloidal particles", Colloids and Surfaces A: Physicochemical and Engineering Aspects, 1998, vol. 137, pp. 253-266.

(56) References Cited

OTHER PUBLICATIONS

Lvov, Yuri, et al., "Biocolloids with Ordered Urease Multilayer Shells as Enzymatic Reactors", Anal. Chem., 2001, vol. 73, pp. 4212-4217.

Crisp, M. Todd, et al., "Preparation of Nanoparticle Coatings on Surfaces of Complex Geometry", Nano Letters, 2003, vol. 3, No. 2, pp. 173-177.

Lvov, Yuri, et al., "Assembly of Thin Films by Means of Successive Deposition of Alternate Layers of DNA and Poly(allylamine)", Macromolecules, 1993, vol. 26, pp. 5396-5399.

Onda, Mitsuhiko, et al., "Sequential Actions of Glucose Oxidase and Peroxidase in Molecular Films Assembled by Layer-by-Layer Alternate Adsorption", Biotechnology and Bioengineering, 1996, vol. 51, pp. 163-167.

Caruso, Frank, et al., "Enzyme Multilayers on Colloid Particles: Assembly, Stability, and Enzymatic Activity", Langmuir, 2000, vol. 16, pp. 9595-9603.

Schüler, Corinna, et al., "Decomposable Hollow Biopolymer-Based Capsules", Biomacromolecules, 2001, vol. 2, pp. 921-926.

Cortez, Christina, et al., "Targeting and Uptake of Multilayered Particles to Colorectal Cancer Cells", Advanced Materials, 2006, vol. 18, pp. 1998-2003.

Dach, Benjamin I., et al., "Cross-Linked "Matrix-Free" Nanocomposites from Reactive Polymer-Silica Hybrid Nanoparticles", Macromolecules, 2010, vol. 43, pp. 6549-6552.

Piggott, Andrew M., et al., "Synthesis of a new hydrophilic o-nitrobenzyl photocleavable linker suitable for use in chemical proteomics", Tetrahedron Letters, 2005, vol. 46, pp. 8241-8244.

Guillier, Fabrice, et al., "Linkers and Cleavage Strategies in Solid-Phase Organic Synthesis and Combinatorial Chemistry", Chem. Rev., 2000, vol. 100, pp. 2091-2157.

International Search Report for PCT/US09/63282, dated Jan. 11, 2010, 2 pages.

Bates, G. H. Frederickson, "Block Copolymers—Designer Soft Materials," Physics Today 52, 32-38 (1999).

Binder et al., "'Click' Chemistry in Polymer and Materials Science," Macromol. Rapid. Comm., vol. 28, pp. 15-54 (2007).

Chen et al.,"Spin-On End-Functional Diblock Copolymers for Quantitative DNA Immobilization," Biomacromolecules, vol. 9, pp. 2345-2352 (2008).

Collman et al., "Mixed Azide-Terminated Monolayers: A Platform for Modifying Electrode Surfaces," Langmuir, vol. 22, pp. 2457-2464 (Mar. 14, 2006).

Collman et al.,""Clicking" Functionality onto Electrode Surfaces," Langmuir, vol. 20, pp. 1051-1053 (Feb. 17, 2004).

De Greest et al., "Degradable Multilayer Films and Hollow Capsules via a 'Click' Strategy," Macromo. Rapid. Comm, vol. 29, pp. 1111-1118 (2008).

Decher et al., "Builup of Ultrthin mutlilayer films by a self-assmebly process, 1 consecutive absorption of anionic and cationic bipolar amphiphiles on chargd surfaces," Macromol. Chem., Macromol. Symp. 46, 321-327 (1991).

Devaraj et al., "Chemoselective Covalent Coupling of Oligonucleotide Probes to Self-Assembled Monolayers," J. Am Chem Soc., vol. 127, pp. 8600-8601 (Jun. 22, 2005).

G. Decher, Fuzzy Nanoassemblies: Toward Layered Polymeric Multicomposites ,Science 277, 1232-1237 (1997).

Heller M.J., "DNA Microarray Technology: Devices, Systems, and Applications," Annu. Rev. Biomed Eng. , vol. 4, pp. 129-153 (2002).

Huang et al., "Effect of Segmental Adsorption on the Tethering of End-Functionalized Polymer Chains," Macromolecules, vol. 37, pp. 516-523 (2004).

Huang et al., "Formation of a Tetra-σ-Bonded Intermediate in Acetylethyne Binding on Si(100)-2×1," Langmuir, vol. 21, pp. 3384-3388 (Apr. 12, 2005).

J.M. Levasalmi, T.J. McCarthy,"Poly(4-methyl-1-pentene) supported polyelectrolyte multilayer films: preparation and gas permeability.", Macromolecules, vol. 30, pp. 1752-1757 (1997).

J.W. Baur, S. Kim, P.B. Balanda, J.R. Reynolds, M.F. Rubner, "Thin-film light-emitting devices based on sequentially adsorbed multilayers of water-solublepoly-(p-phenylene)s.", Adv Mater, vol. 10, pp. 1452-1455 (1998).

Jalbert et al., "End Group Effects on Surface Properties of Polymers: Semiempirical Calculations and Comparison to Experimental Surface Tensions for α,ω-Functional Poly(dimethylsiloxanes)," Macromolecules, vol. 30, pp. 4481-4490 (1997).

Johnson et al., "Construction of Linear Polymers, Dendrimers, Networks, and Other Polymeric Architectures by Copper-Catalyzed Azide-Alkyne Cycloaddition "Click" Chemistry," Macromol. Rapid Comm, vol. 1052-1072 (2008).

Jones et al., Factors affecting the preparation of permanently end-grafted polystyrene layers, Polymer, vol. 40, pp. 525-530 (1999).

Karim et al., "Self-Organization of Polymer Brush Layers in a Poor Solvent," J. Phys. II, pp. 1441-1456 (1995).

Kolb et al, "Click Chemistry: Diverse Chemical Function from a Few Good Reactions," Angew. Chem. Int. Ed. 2001, 40, 2005-2021.

Krivopalov, et al., "1,2,3-Triazole and its derivatives. Development of methods for the formation of the triazile ring.", *Russ. Chem. Rev.* 74, 339-379 (2005).

L. Wang, Y. Fu, Zh. Wang, Y. Fan, X. Zhang, "Investigation into an alternating multilayer film of poly(4-vinylpyridine) and poly(acrylic acid) based on hydrogen bonding.", Langmuir, vol. 15, pp. 1360-1363 (1999).

Laibinis et al., "Comparison of the structures and wetting properties of self-assembled monolayers of n-alkanethiols on the coinage metal surfaces, copper, silver, and gold," J. Am. Chem Soc., vol. 113, pp. 7152-7167 (1991).

Lee et al., "Reactivity of Acetylenyl-Terminated Self-Assembled Monolayers on Gold: Triazole Formation," Langmuir, vol. 20, pp. 3844-3847 (May 11, 2004).

Liang et al., "Covalent Layer-by-Layer Assembly of Conjugated Polymers and CdSe Nanoparticles: Multilayer Structure and Photovoltaic Properties," Adv. Funct. Mater., vol. 16, pp. 542-548 (2006).

Ligoure et al., "Thermodynamics and kinetics of grafting end-functionalized polymers to an interface," J. Phys. (Paris), vol. 51, pp. 1313-1328 (1990).

Luzinov et al., "Polystyrene Layers Grafted to Epoxy-Modified Silicon Surfaces," Macromolecules, vol. 33, pp. 1043-1048 (2000).

M. Wells, D. L. Dermody, H. C. Yang, T. Kim, R. M. Crooks, and A. J. Ricco, "Molecular Interactions Between Organized, Surface-Confined Monolayers and Vapor-phase Probe Molecules. 9. Structure/Reactivity Relationship Between Three Surface-Confined Isomers of Mercaptobenzoic Acid and Vapor-phase Decylamine", Langmuir, 12, 1989 (1996).

Moses et al., "The growing applications of click chemistry," vol. 36, pp. 1249-1262 (2007).

Netzer et al., "A new approach to construction of artificial monolayer assemblies," J. Am. Chem Soc., vol. 105, pp. 674-676 (1983).

Rengifo et al., ""Click-Functional" Block Copolymers Provide Precise Surface Functionality via Spin Coating," Langmuir, vol. 24, pp. 7450-7456 (2008).

S. A. Sukhishvili, and S. Granick, "Layered, erasable polymer multilayers formed by hydrogen-bonded sequential self-assembly.", Macromolecules, vol. 35, pp. 301-310 (2002).

Senaratne et al., "Self-Assembled Monolayers and Polymer Brushes in Biotechnology: Current Applications and Future Perspectives," Biomacromolecules, vol. 6, pp. 2427-2448 (2005).

Seo et al., "Click Chemistry to Construct Fluorescent Oligonucleotides for DNA Sequencing," J. Org. Chem., vol. 68, pp. 609-612 (2003).

Seo et al., "Photocleavable fluorescent nucleotides for DNA sequencing on a chip constructed by site-specific coupling chemistry," roc. Natl. Acad. Sci USA, vol. 101, pp. 5488-5493 (Apr. 13, 2004).

Stroock, Abraham D. et al., "Synthesis of Free-Standing Quasi-Two-Dimensional Polymers," *Langmuir,* 2003, 2466-2472, vol. 19:6.

Such et al., "Assembly of Ultrathin Polymer Multilayer Films by Click Chemistry," J. Am. Chem. Soc., vol. 128, pp. 9318-9319 (2006).

(56) References Cited

OTHER PUBLICATIONS

Sun et al., "Carbohydrate and Protein Immobilization onto Solid Surfaces by Sequential Diels-Alder and Azide-Alkyne Cycloadditions," Bioconjug Chem., vol. 17, pp. 52-57 (2006).

Troughton et al., "Formation of monolayer films by the spontaneous assembly of organic thiols from solution onto gold," J. Am. Chem. Soc., vol. 111, pp. 321-335 (1989).

Ulman a., "Formation and Structure of Self-Assembled Monolayers," Chem Rev., vol. 96, pp. 1533-1554 (1996).

Urbani et al, "Self-Assembly of Amphiphilic Polymeric Dendrimers Synthesized with Selective Degradable Linkages," Macromolecules, vol. 41, pp. 76-86 (2008).

Vestberg et al., "Role of architecture and molecular weight in the formation of tailor-made ultrathin multilayers using dendritic macromolecules and click chemistry," J. Polym Sci. Polym Chem., pp. 2835-2846 (2007).

Wang et al., "Controlled/"Living" Radical Polymerization. Halogen Atom Transfer Radical Polymerization Promoted by a Cu(I)/Cu(II) Redox Process," Micromolecules, vol. 28, pp. 7901-7910 (1995).

White et al., "Toward the Syntheses of Universal Ligands for Metal Oxide Surfaces: Controlling Surface Functionality through Click Chemistry," J. Am. Chem. Soc., vol. 128, pp. 11356-11357 (2006).

Zhang et al., Carbohydrate-Protein Interactions by "Clicked" Carbohydrate Self-Assembled Monolayers, Anal Chem, vol. 78, pp. 2001-2008 (Mar. 15, 2006).

Johnson et al., "Construction of linear polymers, dendrimers, networks, and other polymeric architectures by Copper-Catalyzed Azide-Alkyne Cycloaddition click chemistry," Macromol. Rapid. Commun., vol. 29, pp. 1052-1072 (Jun. 23, 2008).

International Search Report mailed on Jan. 11, 2010, for International patent Application No. PCT/US09/63282 filed Nov. 4, 2009.

Written opinion mailed on Jan. 11, 2010, for International patent Application No. PCT/US09/63282 filed Nov. 4, 2009.

Amit et al., "Photosensitive Protecting Groups of Amino Sugars and Their Use in Glycoside Synthesis, 2-Nitrobenzyloxycarbonylamino and 6-Nitroveratryloxycarbonylamino Derivatives," J. Org. Chem., vol. 39, No. 2, pp. 192-196 (1974).

Office Action issued by the United States Patent and Trademark Office for U.S. Appl. No. 13/429,704 mailed on Mar. 20, 2014 (31 pages).

Office Action issued by the United States Patent and Trademark Office for U.S. Appl. No. 13/572,963 mailed on Mar. 28, 2014 (100 pages).

Gordon Conference on Adhesion at Colby-Sawyer College in new Hampshire from Jul. 26-Jul. 31, 2009—poster presentation by Benjamin Dach from Columbia University.

* cited by examiner

Figures 3A-E

A
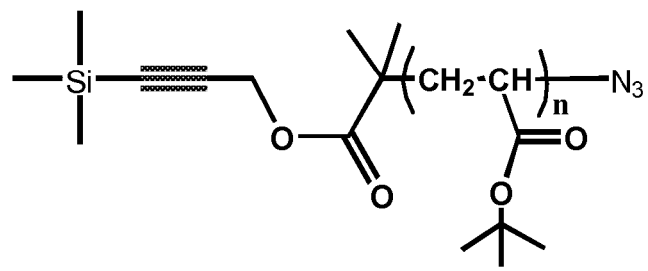
B
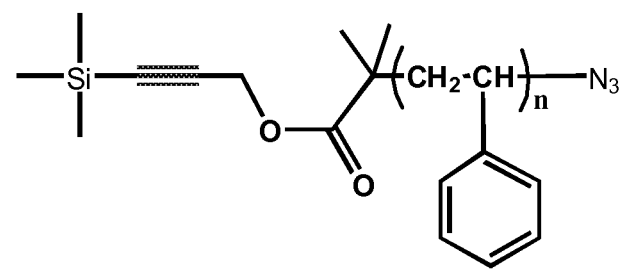
C
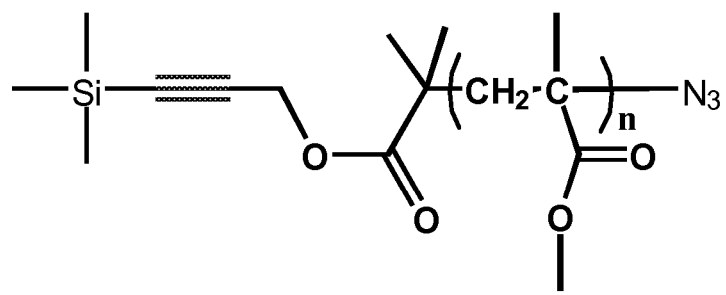
Figures 8A-C

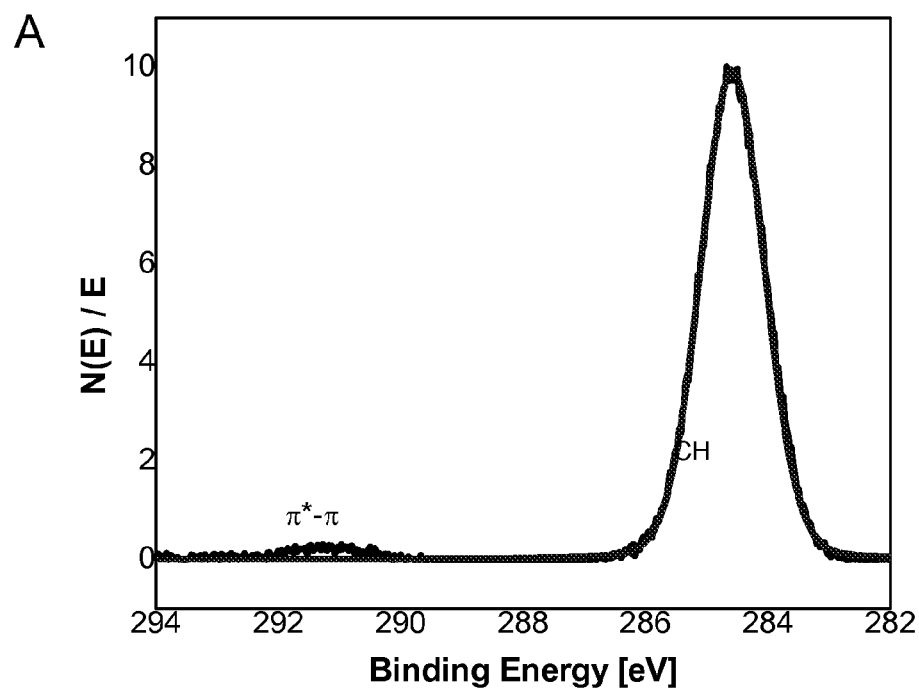
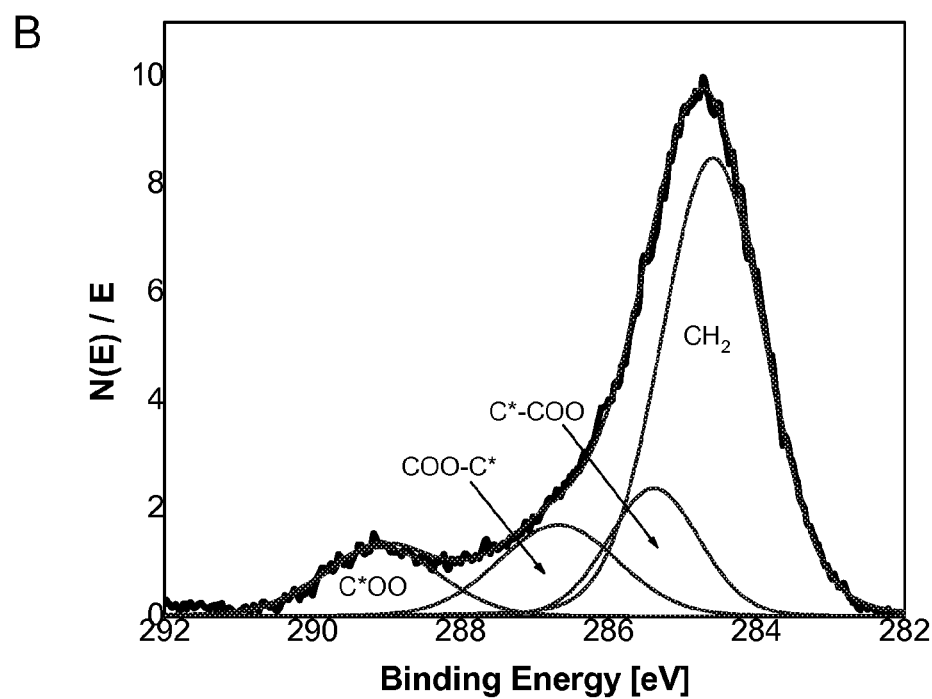
Figures 10A-B

A
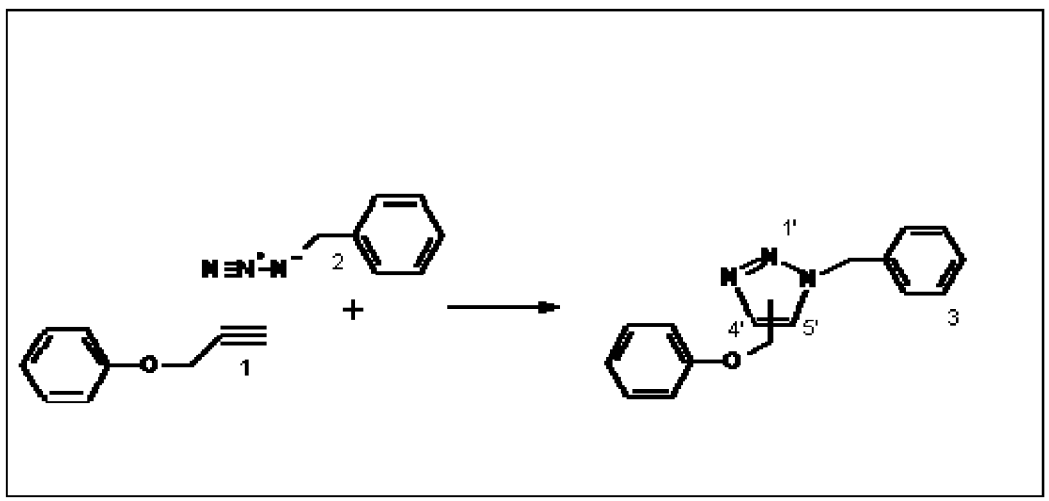
B
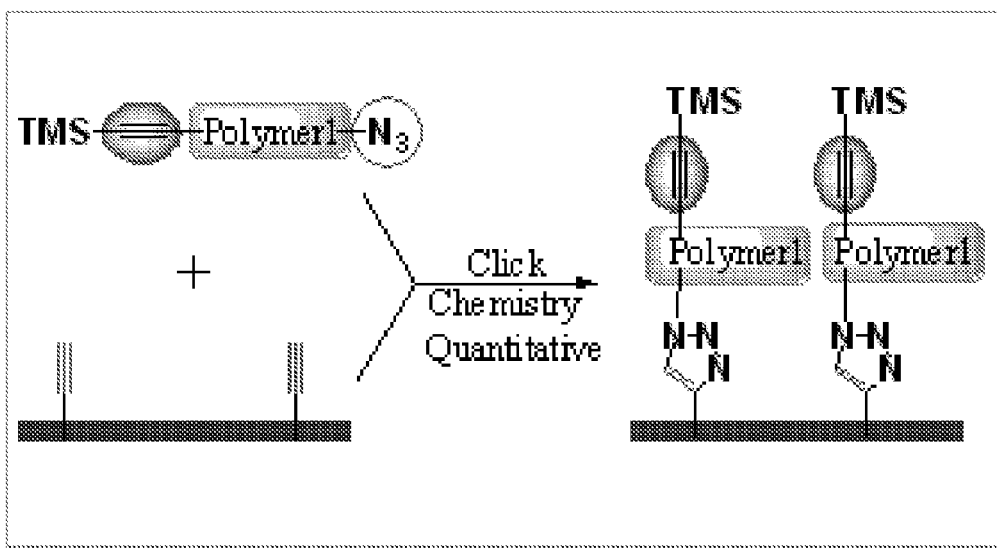
Figure 13

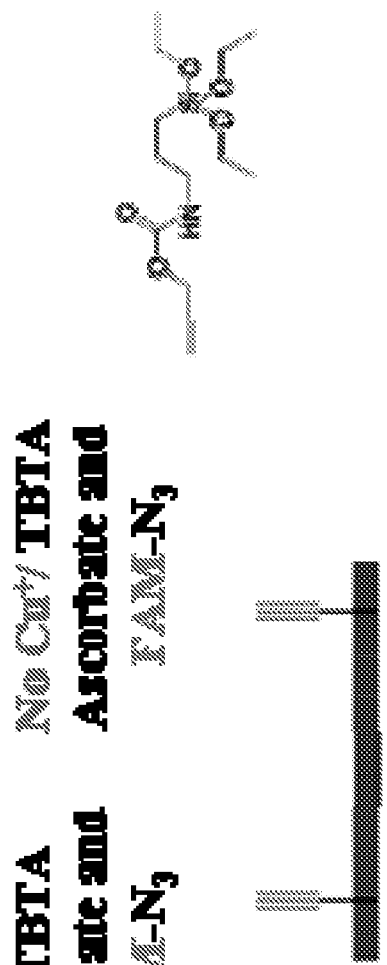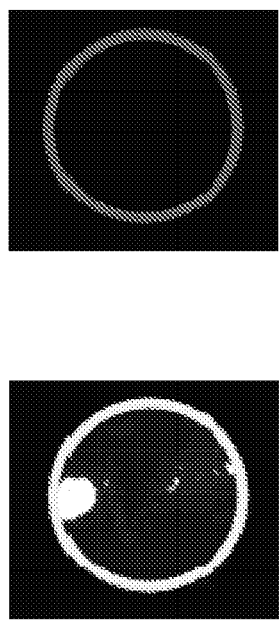
Figure 15

HETEROBIFUNCTIONAL POLYMERS AND METHODS FOR LAYER-BY-LAYER CONSTRUCTION OF MULTILAYER FILMS

This application is a U.S. National Phase application under 35 U.S.C. §371 of International Patent Application No. PCT/US2009/063282 filed Nov. 4, 2009, which claims the benefit of and priority under 35 U.S.C. §119 (e) to U.S. provisional application Ser. No. 61/111,222 filed Nov. 4, 2008, the disclosure of each of which is hereby incorporated by reference in its entirety for all purposes.

This invention was made with government support under DA W911NF-04-1-0282 awarded by the U.S. Army Research Laboratory and the U.S. Army Research Office, and DMR-0703054 awarded by the National Science Foundation, and P50 HG002806 awarded by the National Institutes of Health The government has certain rights in the invention.

This patent disclosure contains material that is subject to copyright protection. The copyright owner has no objection to the facsimile reproduction by anyone of the patent document or the patent disclosure as it appears in the U.S. Patent and Trademark Office patent file or records, but otherwise reserves any and all copyright rights.

All publications, patent applications, patents, and other references mentioned herein are incorporated by reference in their entirety. The patent and scientific literature referred to herein establishes knowledge that is available to those skilled in the art. The issued patents, applications, and other publications that are cited herein are hereby incorporated by reference to the same extent as if each was specifically and individually indicated to be incorporated by reference. In the case of inconsistencies, the present disclosure will prevail.

SUMMARY OF THE INVENTION

In one aspect, the methods described herein relate to a method for generating a multilayer polymer composition, the method comprising: (a) functionalizing a substrate with a surface group to form a functionalized substrate layer, (b) forming a monomolecular layer by contacting the functionalized substrate layer with a hetero-bifunctional polymer comprising a polymer backbone, a click moiety terminus and a protected second click moiety terminus, (c) deprotecting the protected second click moiety terminus to form a functionalized monomolecular layer and, (d) forming a second monomolecular layer by contacting the functionalized monomolecular layer with a second hetero-bifunctional polymer comprising a polymer backbone, a first click moiety terminus and a protected second click moiety terminus. In one embodiment, the method further comprises a step between step (c) and step (d) of forming a functionalized monomolecular layer comprising a heterotrifunctional molecule, the step comprising (i) contacting the functionalized monomolecular layer of step (c) with a heterotrifunctional molecule comprising a first click moiety group and at least two protected second click moiety groups, and (ii) deprotecting the protected second click moiety groups of the heterotrifunctional molecule to form a functionalized monomolecular layer. In another embodiment, the method comprises a washing step after step (d). In another embodiment the method further comprises a step between step (c) and step (d) of forming a functionalized monomolecular layer comprising a heterotrifunctional molecule, the step comprising (i) contacting the functionalized monomolecular layer of step (c) with a heterotrifunctional molecule comprising a first click moiety group and at least two second click moiety groups, to form a functionalized monomolecular layer. In one embodiment, the method comprises a step of repeating steps (c) to (d) until a multilayer polymer composition having (i) a surface monomolecular layer comprising a surface hetero-bifunctional polymer, and (ii) a desired number of monomolecular layers between the substrate layer and the surface monomolecular layer is obtained. In another embodiment, the method further comprises a step of contacting the functionalized monomolecular layer of step (c) with a molecule having at least a first click moiety terminus and an effector moiety to form a surface effector layer.

In another aspect, the methods described herein relate to a method for generating a multilayer polymer composition, the method comprising: (a) functionalizing a substrate with a surface group to form a functionalized substrate layer, (b) forming a functionalized monomolecular layer by contacting the functionalized substrate layer with a hetero-bifunctional polymer comprising a polymer backbone, a click moiety terminus and a second click moiety terminus, (c) washing the functionalized monomolecular layer, and (d) forming a second monomolecular layer by contacting the functionalized monomolecular layer with a second hetero-bifunctional polymer comprising a polymer backbone, a first click moiety terminus and a second click moiety terminus. In one embodiment, the method comprises the step of repeating steps (b) to (d) until a multilayer polymer composition having (i) a surface monomolecular layer comprising a surface hetero-bifunctional polymer, and (ii) a desired number of monomolecular layers between the substrate layer and the surface monomolecular layer is obtained. In another embodiment, the method further comprises a step of contacting the functionalized monomolecular layer of step (c) with a molecule having at least a first click moiety terminus and an effector moiety to form a surface effector layer.

In one embodiment the molecule having at least a first click moiety terminus and an effector moiety to form a surface effector layer is a polymer.

In another embodiment, the heterobifunctional polymer further comprises an effector moiety.

In one embodiment, the effector moiety is a polypeptide (e.g. an enzyme or an antibody or a fragment thereof), an oligonucleotide, a lipid, a carbohydrate, a small molecule, a drug, a ligand, a catalyst, a dye, a sensor, an analyte or any combination thereof.

In still a further embodiment, the polypeptide is an enzyme or an antibody.

In yet another embodiment, the dye is a fluorescent dye.

In another embodiment, the effector moiety is a thermochemically reactive group, a photochemically reactive group.

In one embodiment, the first click moiety terminus is an azide group and the protected second click moiety terminus is a trimethylsilyl alkyne group.

In another embodiment, the first click moiety group of the heterotrifunctional molecule is a an azide group and the at least two protected second click moiety groups of the heterotrifunctional molecule are trimethylsilyl alkyne groups.

In yet another embodiment, the first click moiety terminus is an alkyne group and the second click moiety terminus is an azide group.

In another embodiment, the first click moiety group of the heterotrifunctional molecule is an alkyne group and the at least two second click moiety groups of the heterotrifunctional molecule are azide groups.

In one embodiment, the substrate is a planar surface, a colloidal particle, a nanoparticle, a microparticle, or any combination thereof.

In another embodiment, the substrate is comprises a glass.

In yet another embodiment, the substrate comprises a ceramic, a crystal, a silicon, a metal oxide, a metal alloy, gold, quartz, indium tin oxide, antimony tin oxide, a semiconductor, a semiconductor alloy or any combination thereof.

In yet another embodiment, the substrate is electrically conducting, electrically insulating or semi-conducting.

In still a further embodiment, the substrate is a carbon nanotube.

In yet another embodiment, the substrate is a polymer.

In still a further embodiment, the polymer is a polypeptide, an organic polymer, a polymer precursor, a thermoplastic polymer, a thermosetting polymer, a copolymer, a terpolymer, an oligomer, a homopolymer, a block copolymer, an alternating block copolymer, a random polymer, a random copolymer, a random block copolymer, a graft copolymer, a star block copolymer, a dendrimer or any combination thereof.

In yet another embodiment, the contacting of the heterobifunctional polymer and the functionalized substrate surface or the heterobifunctional polymer and the functionalized monomolecular layer or the heterotrifunctional molecule and the functionalized monomolecular layer is performed by spin coating, dip coating, spray coating, layer by layer assembly, drop casting, electrostatic painting, or a combination thereof.

In one embodiment, the heterobifunctional polymer is a TMS-alkyne-PS—N3, TMS-alkyne-PtBA-N3, or TMS-alkyne-PMMA-N3.

In another embodiment, the polymer backbone is αtrimethylsilyl alkyne-β-azide-poly(styrene), αtrimethylsilyl alkyne -β-azide-poly (tert-butyl acrylate) or αtrimethylsilyl alkyne -β-azide-poly (methyl methacrylate).

In still a further embodiment, the polymer backbone is a polymer, a blend of polymers, a polymer precursor, a thermoplastic polymer, or a thermosetting polymer.

In yet another embodiment, the polymer backbone is a copolymer, a homopolymer, a copolymer, a block copolymer, an alternating block copolymer, a random polymer, a random copolymer, a random block copolymer, a dendrimer, or any combination thereof.

In still a further embodiment, the substrate is a comprises glass

In yet another embodiment, the substrate comprises silicon, metal oxide, metal alloy, gold, quartz, indium tin oxide materials, antimony tin oxide materials, a semiconductor, a semiconductor alloy, an organic material, polymer or any combination thereof.

In still a further embodiment, the substrate is a polypeptide or an oligonucleotide.

In another aspect, the invention relates to a multilayer polymer composition manufactured by the methods described herein.

In one embodiment, the multilayer polymer composition has a thickness of about 3 nm to about 8 nm.

BRIEF DESCRIPTION OF THE FIGURES

FIG. 8. Structure of α-TMS-alkyne-β-azide-poly(tert-butyl acrylate) (FIG. 8A), α-TMS-alkyne-β-azide-poly(polystyrene) (FIG. 8B) and α-TMS-alkyne-β-azide-poly(methyl methacrylate) (FIG. 8C).

FIG. 10. FIG. 10A shows deconvolution results for the XPS high resolution C1s spectrum of first layer of PS after click chemistry showing the contribution of carbon and the π*-π shake-up satellite (TOA=15°). FIG. 10B shows deconvolution results for the XPS high resolution C1s spectrum of first layer of PtBA after click chemistry showing the contribution of each carbon type (TOA=15°).

FIG. 13. Understanding the reactions of polymers at polymer interfaces requires access to a variety of functional surfaces (composition, nature and density of functional groups, etc.). Access to highly reliable polymer interfaces requires development of highly efficient chemical transformations. Click-Chemistry is fast, efficient, simple, economic, safe and can use small molecules (FIG. 13A) and surfaces and functional polymers (FIG. 13B).

DETAILED DESCRIPTION OF THE INVENTION

Figure 1:
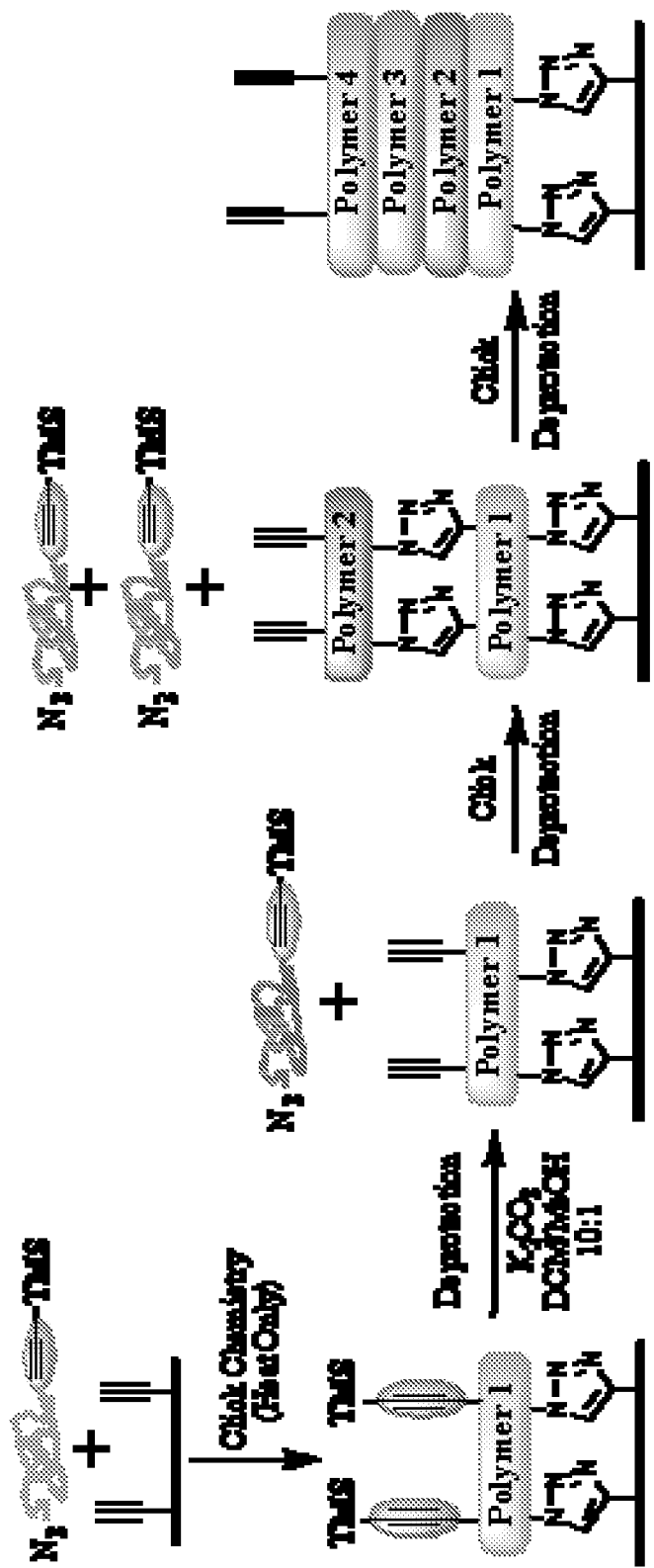
FIG. 1. A schematic illustration of a method of generating multilayer polymer compositions according to some embodiments of the methods described herein.

Described herein are methods and compositions useful for covalent layer-by-layer assembly (CLbL) of polymer molecules for the preparation of multilayer polymeric compositions. In certain embodiments, the methods described herein can be used to prepare covalently bonded multilayers or polymeric compositions by solid phase synthesis. In certain embodiments, the methods described herein can also be used to prepare covalently bonded multilayers or polymeric compositions comprising at least one heterobifunctional polymer or at least one heterotrifunctional molecule. Also described herein are methods and compositions for controlling thickness of one or more monomolecular layers of a polymer surface comprising one or more different polymers deposited in any desired sequence.

Definitions

As used herein and in the appended claims, the singular forms "a," "an," and "the" include plural references unless the content clearly dictates otherwise.

The term "about" is used herein to mean approximately, in the region of, roughly, or around. When the term "about" is used in conjunction with a numerical range, it modifies that range by extending the boundaries above and below the numerical values set forth. The term "about" is used herein to modify a numerical value above and below the stated value by a variance of 20%.

As used herein, the term "click chemistry" refers to the use of chemical building blocks to drive a linkage reaction with appropriate complementary sites in other blocks. These chemical reactions (e.g., including, but not limited to, those between azide and alkyne groups) are specific and result in covalent linkage between the two molecules. Click chemistry can be used to drive selective modular, stereospecific coupling of molecules (Kolb, H. C., Finn, M. G., and Sharpless, K. B. Angew. Chem. Int. Ed. 2001, 40, p. 2005). Click chemistry can be used to link molecules through a covalent bond and has been used to modify surfaces and surface properties (J. E. Moses and A. D. Moorhouse, Chem. Soc. Rev 2007, 1249-1262).

In one aspect, the methods described herein relate to a method for assembling a multilayer polymer composition comprising heterobifunctional (HetBi) polymer monomolecular layers prepared through solid phase synthesis by sequential deposition of two or more HetBi polymer monomolecular layers on a surface. In certain embodiments, the multilayer polymer compositions describe herein can further comprise one or more heterotrifunctional molecules between a substrate surface and a heterobifunctional polymer layer or between two heterobifunctional polymer layers. The methods described herein can be used for crosslinking any of the heterobifunctional components described herein to produce a multilayer polymeric composition.

In one embodiment, the HetBi polymers described herein are terminated at one end with an azide group ($N_3$) and on the other end with a trimethylsilyl protected alkyne group (TMS-≡). In the disclosed methods, a 1,3-dipolar cycloaddition reaction takes place between the azide group moiety on a first polymer and the alkyne moiety of a second polymer to result in covalent attachment between the first polymer and the second polymer. In one example, the methods described herein can be used for sequential monomolecular layering of heterobifunctional (HetBi) polymers wherein the HetBi polymers each contain two complementary end groups capable of click reactions. In one embodiment, the method can be performed by contacting a first heterobifunctional polymer comprising at least one azide moiety with a second heterobifunctional polymer, having one or more alkyne moieties. In certain embodiments, the first heterobifunctional polymer will be bound to a functionalized surface and present an unreacted alkyne moiety capable of binding to a second polymer having at least an azide group, however, one of skill in the art will appreciate that the order in which the functional polymers described herein are contacted an joined can be reversed.

Also described herein are methods for generating heterotrifunctional polymers suitable for covalently joining up to three heterobifunctional polymers. In one embodiment, the heterotrifunctional polymers described herein can be used to prepare branched multilayer compositions wherein a first heterobifunctional polymer is covalently linked to at least one, or at least two other heterobifunctional polymers through a trifunctional molecule.

In one aspect, the methods and compositions described herein are useful for providing increased reliability and stability of a multilayer system to generate high performance materials. In certain embodiments, the methods described herein can be used to generate a multilayer polymer composition. Conventional layer by layer (LbL) assembly techniques construct multilayer thin films by sequential deposition of monomolecular layers of organic molecules. One of the drawbacks associated with their use is that monomolecular layers are held together by relatively weak forces such as Van der Waals, electrostatic and hydrogen bonding interactions, and can therefore be lacking in mechanical integrity. In Langmuir-Blodgett film deposition (Blodgett, J. Am. Chem. Soc. 56, 495-495 (1934); Blodgett, Langmuir, Phys. Rev. 51, 964-982 (1937); Kuhn and Mobius, Angew. Chem. Int. Ed. Engl. 10, 620-637 (1971)) monomolecular layers of amphiphilic molecules (i.e., molecules with a hydrophilic head group and a hydrophobic tail) floating on water can be deposited onto substrates by repeatedly passing the substrate of interest through the floating monolayer. One or two monomolecular layers spontaneously can be deposited onto the substrate during each dipping cycle. The monomolecular layers can be held together by interactions between the head groups and tails of molecules in adjacent monomolecular layers, and by in-plane Van der Waals interactions between tails. In alternating layer-by-layer assembly (4) (ALbL), monomolecular layers of two complementary materials are deposited one after another in repetitive fashion to build up a macroscopic film. Alternating monomolecular layers adhere to each other by means of complementary interactions between the two molecules, for example, electrostatic interactions between positively charged and negatively charged polyelectrolytes (5-6), or hydrogen bonding interactions between proton donors and proton acceptors (7-8). ALbL assemblies of carboxylic acid functional nanoparticles (Liang et al, Adv. Funct. Mater. 16, 542-548 (2006)) with amine-derivatized conjugated polymers have been covalently linked by formation of amide groups between the two components. Alternating monomolecular layers of dendrimers (Vestberg et al, J. Polym. Sci. Polym. Chem. 45, 2835-2846 (2007); Urbani et al, Macromolecules 41, 76-86 (2008)), polyelectrolytes (Such et al, J. Am. Chem. Soc. 128, 9318-9319 (2006)) and dextrans (De Greest et al, Macromo. Rapid Comm. 29, 1111-1118 (2008)) have been covalently bonded by promoting 1,3-dipolar cycloaddition reactions (i.e., "click" chemistry) (Kolb et al, Angew. Chem. 40, 2004-2021 (2001);Binder and Sachsenhofer, Macromol. Rapid Comm. 28, 15-54 (2007)), between alkyne and azide groups on the complementary polymers. A drawback of thin films prepared by LBL techniques is a lack of physical robustness and mechanical integrity due to relatively weak interlayer adhesion.

In certain aspects the solid phase CLbL polymer synthesis method described herein differs from other LbL methods because the click coupling reactions employed in the methods described herein are chemoselective. The heterobifunctional polymers (e.g. heterobifunctional polymers functionalized with one azide chain terminus and a protected alkyne group as the other chain terminus) and the heterotrifunctional molecules (e.g. heterotrifunctional molecules functionalized with one azide moiety and two protected alkyne group moieties) constitute a powerful and versatile means for the covalent layer-by-layer (CLbL) assembly of thin polymer films. Each monomolecular layer can be covalently bound to both the preceding and following layers to produce a robust multilayer structure. Because the coupling chemistry used, "click" chemistry, is chemoselective, the layering process can be independent of the chemical nature of the polymer so that the constitution of each monomolecular layer can be selected at will.

In contrast to other layer-by-layer deposition techniques, the monomolecular layer thickness in CLbL is not equivalent to the diameter of the polymer chain, but is related to the polymer chain length and can be controlled by adjustment of either the polymer molecular weight or the areal density of surface alkyne groups. The chemical nature of each subsequent monomolecular layer can be modified while retaining covalent bonding between each monomolecular layer. In conventional LbL techniques, where the thickness of each monomolecular layer is generally equal to the effective cross sectional diameter of the polymers used. The thickness of each monomolecular layer of the multilayer polymer compositions described herein can be proportional to the molecular weight of the heterobifunctional polymer. This feature can enable a rapid buildup of thickness with each deposition cycle. Use of the methods of the invention also circumvents the need to alternate monomolecular layers of two different polymers because each heterobifunctional polymer contains both complementary functionalities required for the interlayer coupling reaction.

The methods and compositions described herein can be used to for modification of functionalized substrates (e.g. flat, round, random or any shape). Also described herein are systems and methods for fabricating ordered and covalently bonded organic monolayers are described. In one embodiment, flexible hetero-bifunctional homopolymers, block copolymers and/or multiblock copolymers can be used to covalently attached multilayer functional system in a step-by-step (or layer-by-layer) fashion. For example, the methods and compositions of the invention can be used for the construction of devices having specific functional groups, morphologies, and physical and chemical properties. In another aspect, the methods and compositions of the invention relate to alternating three monomolecular layer functional surfaces constructed using two hetero-bifunctional homopolymers using flat glass surface functionalized with alkyne-based ligands.

A first step in the methods described herein can involve functionalization of a substrate surface with a surface group (e.g. a surface alkyne group (≡)). The substrate may be of any shape, form or template. For example, in one embodiment, the substrate is a planar substrate or a substantially planar substrate. In other embodiments, the substrate can be a colloidal particle, a nanoparticle, a microsphere, a crystal, and the like. A substrate suitable for use with the methods described herein may comprise any suitable material known in the art, including, but not limited to glass materials, ceramic materials, silicon materials, metal oxide materials, metal alloy materials, gold materials, quartz materials, indium tin oxide materials, antimony tin oxide materials, semiconductor materials, semiconductor alloy materials, organic materials (e.g. organic solid materials) and polymeric materials. The substrate can further comprise carbon nanotubes, polypeptides, peptides, organic polymers, polymer precursors, thermoplastic polymers, a blend of thermoplastic polymers, thermosetting polymers or any combination thereof. The substrate can also comprise a blend of polymers, copolymers, terpolymers, and can be a oligomer, a homopolymer, a copolymer, a block copolymer, an alternating block copolymer, a random polymer, a random copolymer, a random block copolymer, a graft copolymer, a star block copolymer, a dendrimer, or the like.

In certain embodiments, the substrate can be coated with a coating material. Suitable coating materials include, but are not limited to polyethyleneimine (PEI). In other embodiments, the substrate can be modified to comprise one or more functional groups (e.g. halogen groups). In certain embodiments, the substrate can be a degradable material (e.g. a polyester) or a removable material and substrates can be selected for the ability to destroy the substrate under specific conditions.

Methods for achieving a functionalized alkyne surface on different substrate surfaces are also known in the art. Exemplary methods include, but are not limited self-assembly of alkyne-functional phosphonate esters for metal oxide substrates (White et al, J. Am. Chem. Soc. 128, 11356-11357 (2006)), alkyne-functional thiols for gold substrates (Troughtoyt et al, Am. Chem. Soc. 111, 321-335 (1989)), alkyne-functional silanes for glass substrates (Netzer and Sagiv, J. Am. Chem. Soc. 105, 674-676 (1983).) or alkyne-functional block copolymers (Rengifo et al, Langmuir 24, 7450-7456 (2008); Chen et al, Biomacromolecules 9, 2345-2352 (2008)) for glass and polymeric substrates. Methods for functionalizing glass and silicon wafer can also be accomplished by forming a self-assembled monolayer (SAM) (Ulman, Chem. Rev. 96, 1553-1574 (1996); Dubois and Nuzzo, Annu Rev. Phys. Chem. 43, 437-463 (1992); Laibinis et al, J. Am. Chem. Soc. 113, 7152-7167 (1991); Senaratne and Andruzzi, Ober, Biomacromolecules 6, 2427-2448 (2005)) of an alkyne functional silane on the substrate surface. One method for functionalizing a glass substrate with surface alkyne groups is to clean the glass substrate by soaking in $H_2SO_4$ and $H_2O_2$ (3:1 w/w) for 30 min followed by spin coating of a solution of 50 mg of silane in 1 g of solvent on the galls surface. The surface alkyne groups can then be formed by annealing at 110° C. for 3 hrs under vacuum.

In one aspect, the methods described relate to methods for preparing multilayer functionalized surfaces. In one embodiment, the methods described herein relate to a solid phase CLbL method for generating a multilayer polymer composition by depositing heterofunctional polymers in successive heterofunctional polymer monomolecular layers. In one embodiment, a first heterofunctional polymer can be deposited onto a functionalized substrate surface by any suitable technique to form a first polymer monomolecular layer. In another embodiment, a first heterotrifunctional molecule can be deposited on a the functionalized substrate surface (before the deposition of a first heterobifunctional polymer) to form a heterotrifunctional molecule layer.

Suitable methods for depositing heterofunctional polymers or heterotrifunctional molecules to form the multilayer polymer compositions described herein include, but are not limited to dip coating, spin coating, spray coating, layer by layer assembly, drop casting, electrostatic painting, or any combination thereof. One skilled in the art will recognize that other methods for dispersing a heterobifunctional polymer or a heterotrifunctional molecule over a surface include, for example, dropwise addition or spin coating of a solution comprising a heterobifunctional polymer or the heterotrifunctional molecule. In one embodiment, the surface can be a functionalized substrate surface. In another embodiment, the surface can be a surface comprising a previously deposited heterobifunctional polymer or a heterotrifunctional molecule, wherein the heterobifunctional polymer or a heterotrifunctional molecule comprised on the surface has one or more deprotected click chemistry moieties. In one embodiment, the concentration of a heterobifunctional polymer in a heterobifunctional polymer solution will be sufficient to form a heterobifunctional polymer monomolecular layer on the substrate or on the previously deposited surface. In another embodiment, the concentration of a heterotrifunctional molecule in a heterotrifunctional molecule solution will be sufficient to form a heterotrifunctional molecule layer on the substrate or on the previously deposited surface. For example, in certain embodiments, the concentration of a heterobifunctional polymer in a heterobifunctional polymer solution, or of a heterotrifunctional molecule in a heterotrifunctional molecule solution can be in the range of 0.001 to 100 mg/ml.

In accordance with the methods described herein, each deposition cycle in the CLbL method for generating a multilayer polymer composition can involve at least two steps an interfacial click reaction and deprotection of the silane protected alkyne end group. In one embodiment, covalent deposition of a first monomolecular layer involves a "click" reaction (e.g., 1,3-dipolar cycloaddition) between azide termini on a first HetBi Polymer and alkyne groups on the functionalized substrate surface. The result of the first reaction process is a substrate coated with a covalently bound monolayer of HetBi Polymer that presents protected alkyne groups (TMS-≡) at the surface.

In certain embodiments, covalent deposition of a monomolecular layer involves a "click" reaction (e.g., 1,3-dipolar cycloaddition) between a first click moiety (e.g. a deprotected alkyne group) on a functionalized substrate surface or on a previously deposited heterobifunctional polymer monomolecular layer) and a second click moiety (e.g. an azide terminus) on a heterobifunctional polymer.

In another embodiment, covalent deposition of a monomolecular layer involves a "click" reaction (e.g., 1,3-dipolar cycloaddition) between a first click moiety (e.g. a deprotected alkyne group) on a functionalized substrate surface or on a previously deposited heterobifunctional polymer monomolecular layer) and a second click moiety (e.g. an azide terminus) on a heterotrifunctional molecule.

In another embodiment, covalent deposition of a monomolecular layer involves a "click" reaction (e.g., 1,3-dipolar cycloaddition) between a first click moiety (e.g. a deprotected alkyne group) on a heterotrifunctional molecule comprising at least two deprotected alkyne groups and a second click moiety (e.g. an azide terminus) on a heterotrifunctional molecule.

In another embodiment, covalent deposition of a monomolecular layer involves a "click" reaction (e.g., 1,3-dipolar cycloaddition) between a first click moiety (e.g. a deprotected alkyne group) on a heterotrifunctional molecule comprising at least two deprotected alkyne groups and a second click moiety (e.g. an azide terminus) on a heterotrifunctional molecule.

The click reactions described herein can be performed by contacting a first hetero-bifunctional polymer comprising a polymer backbone, a deprotected first click moiety terminus and a second click moiety terminus with a second hetero-bifunctional polymer comprising a polymer backbone, a first click moiety terminus and a second click moiety terminus. The click reactions described herein can also be performed by contacting a hetero-bifunctional polymer comprising a polymer backbone, a deprotected first click moiety terminus and a second click moiety terminus with a heterotrifunctional molecule comprising a first click moiety group and at least two second click moiety groups.

In one embodiment, the one click moiety is a deprotected alkyne group terminus and another click moiety is an azide terminus, however any type of click chemistry can be used in conjunction with the methods described herein so long as the first and second click moiety termini (e.g. click chemistry pairs) can participate in a selective covalent bond forming reaction with each other.

Examples of click chemical moieties suitable for use with the methods described herein include, but are not limited to, alkynyl groups, azido groups, nitrile groups, conjugated diene groups, epoxide groups, carbonyl groups, aziridine groups, or the like. Exemplary click chemistry pairs can include, but are not limited to, 1,3-Huisgen Dipolar Cycloaddition (e.g. wherein a first click moiety terminus is an alkyne group and a second click moiety terminus is a azide group), 1,3-Huisgen Dipolar Cycloaddition (e.g. wherein a first click moiety terminus is a nitrile group and a second click moiety terminus is an azide group), Diels-Alder Cycloaddition (e.g. wherein a first click moiety terminus is an dienophile group and a second click moiety terminus is a diene group), Non-Aldol Carbonyl Chemistry (e.g. wherein a first click moiety terminus is an isocyanate group and a second click moiety terminus is an amine group), Non-Aldol Carbonyl Chemistry (e.g. wherein a first click moiety terminus is an isothiocyanate group and a second click moiety terminus is an amine group), Non-Aldol Carbonyl Chemistry (e.g. wherein a first click moiety terminus is a ketone group and a second click moiety terminus is an alkoxyamine group), Non-Aldol Carbonyl Chemistry (e.g. wherein a first click moiety terminus is an aldehyde group and a second click moiety terminus is an alkoxyamine group), Michael addition (e.g. wherein a first click moiety terminus is an enolate group and a second click moiety terminus is an alpha ketone group), Michael addition (e.g. wherein a first click moiety terminus is an enolate group and a second click moiety terminus is a beta ketone group), Michael addition (e.g. wherein a first click moiety terminus is an enolate group and a second click moiety terminus is an unsaturated ketone group), and Nucleophilic Ring Opening Reactions (e.g. wherein at least one click moiety terminus is an epoxide group). In certain embodiments, two or more polymer layers in the multilayer polymer composition described herein can be covalently joined by the same type of click chemistry reaction (e.g. a 1,3-dipolar cycloaddition click reaction). In certain embodiments, two or more polymer layers in the multilayer polymer composition described herein can be covalently joined by the a different type of click chemistry reaction.

Covalent addition of a HetBi polymer monomolecular layer to either a functionalized alkyne substrate surface, a heterotrifunctional molecule surface comprising a deprotected alkyne group or on a previously deposited HetBi polymer monomolecular layer surface comprising a deprotected alkyne group can be accomplished by dissolving the HetBi polymer in toluene for form a HetBi polymer solution and spin coating the HetBi polymer solution onto the surface. Similarly, addition of a heterotrifunctional molecule layer to either a functionalized alkyne substrate surface, a heterotrifunctional molecule surface comprising a deprotected alkyne group or on a previously deposited HetBi polymer monomolecular layer surface comprising a deprotected alkyne group can be accomplished by dissolving the heterotrifunctional molecule in toluene for form a heterotrifunctional molecule solution and spin coating the heterotrifunctional molecule solution onto the surface.

A thermally initiated "click" reaction between substrate-bound alkyne groups and the azide termini can then be achieved by placing the coated surfaces in a vacuum oven and heating them for about 3 hours to about 12 hours at a temperature of about 100° C. to about 115° C. In certain examples, the click reactions (e.g. a 1,3-dipolar cycloaddition click reaction) described herein can be performed at a temperature from about -4° C. to about 130° C., from about 4° C. to about 125° C., from about 30° C. to about 120° C., from about 55° C. to about 115° C., from about 75° C. to about 115° C., from about 90° C. to about 115° C., or from about 100° C. to about 115° C.

Although thermal initiation can be used to perform the click reactions (e.g. a 1,3-dipolar cycloaddition click reaction) described herein, the click reactions (e.g. a 1,3-dipolar cycloaddition addition click reaction) can also be achieved with the addition of a metal catalyst. In certain embodiments the metal catalyst is a metal selected from the group consisting of Au, Ag, Hg, Cd, Zr, Ru, Fe, Co, Pt, Pd, Ni, Cu, Rh, W, Ru, Pt, Ni, Cu, and Pd. In one embodiment, more of more metal catalysts can be used to achieve the click reactions (e.g. a 1,3-dipolar cycloaddition click reaction) described herein. In one embodiment, the click reactions (e.g. a 1,3-dipolar cycloaddition click reaction) described herein are achieved with a Cu(I) metal catalyst. Any other method for achieving the click reactions (e.g. a 1,3-dipolar cycloaddition click reaction) described herein can also be used. Suitable methods include, but are not limited to high pressure reaction conditions or irradiation such as by microwaves. In certain embodiments, electron-deficient alkynes can also be used to achieve the click reactions (e.g. a 1,3-dipolar cycloaddition click reaction) described herein (Li et al., Tetrahedron Lett. 2004, 45, 3143-3146).

In specific embodiments, the click reaction (e.g. a 1,3-dipolar cycloaddition click reaction) conditions can be performed at a pH of from about 0 to about 8, from about 1 to about 7, from about 2 to about 6, from about 3 to about 5, or from about 4 to about 8. In another embodiment, the click reaction (e.g. a 1,3-dipolar cycloaddition click reaction) can be performed in an aqueous media or in a biological fluid (e.g. water, dimethylformamide, dimethylsulfoxide, and alcohols, diols, and glycerols or any combination thereof) or in the presence of cells, biomolecules, tissues, and salts.

The alkyne functional surface (≡) can be regenerated by deprotection of the protected alkyne groups. Deprotection of the terminal TMS-alkyne groups can be performed by any method known in the art. In one example, terminal TMS-alkyne group deprotection is accomplished by dipping a surface coated with a covalently bound monolayer of HetBi Polymer (heterotrifunctional molecule) that presents protected alkyne groups (TMS-≡) at the surface into a $K_2CO_3$ saturated solution of 10:1 DCM/MeOH to form a deprotected alkyne surface. The deprotected alkyne surface can then be used to couple additional macromolecular layers by repeating the two-step deposition cycle with other HetBi polymers (or heterotrifunctional molecules) by covalent attachment through a click reaction between azide termini of HetBi polymer (or heterotrifunctional molecule) with the regenerated surface alkyne groups. There is no requirement according to the methods described herein that any subsequent monomolecular layers of HetBi polymers (or heterotrifunctional molecules) be the same as that used for the first monomolecular HetBi polymer monomolecular (or heterotrifunctional molecule) layer or in any other HetBi polymer monomolecular (or heterotrifunctional molecule) layer in the multilayer polymer composition. Rather, the layering process can be applied to prepare covalently bound multilayers from any desired sequence of polymers (or heterotrifunctional molecule) by repetition of the process described herein. In fact, the chemoselective nature of the click coupling reactions employed herein allows that each subsequent monomolecular layer can be selected according to one or more desired properties (e.g. molecular weight, hydrophobicity, length . . . etc) of the HetBi polymer or of the HetBi polymer monomolecular layer. Another aspect of the methods described herein is that because the HetBi monomolecular layers (or heterotrifunctional molecules) are joined by a covalent bond, each functionalized monomolecular layer or surface effector layer can be washed and any non-specific absorbing species can be eliminated without a loss of the in the activity of the functionalized monomolecular layer or surface effector layer.

The multilayer polymeric composition described herein can comprise any number of HetBi polymer monomolecular layers. In certain embodiments, the multilayer polymeric composition will have one HetBi polymer monomolecular layer, two HetBi polymer monomolecular layers, three HetBi polymer monomolecular layers, four HetBi polymer monomolecular layers, five HetBi polymer monomolecular layers, six HetBi polymer monomolecular layers, seven HetBi polymer monomolecular layers, eight HetBi polymer monomolecular layers, nine HetBi polymer monomolecular layers, or ten or more HetBi polymer monomolecular layers. The number of polymer monomolecular layers may in part be dictated by the end use application of the multilayer polymeric composition.

The multilayer polymeric composition described herein can comprise any number of heterotrifunctional molecular layers. In certain embodiments, the multilayer polymeric composition will have one heterotrifunctional molecular layer, two heterotrifunctional molecular layers, three heterotrifunctional molecular layers, four heterotrifunctional molecular layers, five heterotrifunctional molecular layers, six heterotrifunctional molecular layers, seven heterotrifunctional molecular layers, eight heterotrifunctional molecular layers, nine heterotrifunctional molecular layers, or ten or more heterotrifunctional molecular layers. The number of heterotrifunctional molecular layers may in part be dictated by the end use application of the multilayer polymeric composition.

The HetBi polymers described herein can be readily prepared by any method known in the art, including, but not limited to atom transfer radical polymerization (ATRP) (Wang and Matyjaszewski. Macromolecules 28, 7901-7910 (1995). For example, the HetBi polymers can be readily prepared by use of a trimethylsilyl protected alkyne-functional ATRP initiator to polymerize the monomers. Conversion of the resultant terminal bromine groups to azides can be performed by the addition of sodium azide. In one embodiment, the Alkyne-Functional Initiator-TMS described herein can be prepared by stirring 3-(trimethylsilyl)propargyl alcohol (5 g, 38.98 mmol), triethylamine ($Et_3N$ 3.93 g, 38.98 mmol) and 50 mL of dry $Et_2O$ in a round bottom flask in an ice-water bath for 20 min. Bromoisobutyryl bromide (7.8 g, 33.90 mmol) dissolved in 15 mL of dry $Et_2O$ can then be added drop-wise before the reaction is allowed to warm-up to 23° C. Stirring can be continued for 24 h. The reaction mixture can then be poured into ice-water and the organic product can be extracted with $CH_2Cl_2$. The organic phase can then washed with 100 mL $H_2O$ (2×) and 100 mL brine (2×), and then dried over anhydrous $Na_2SO_4$. The solvent can then be distilled at 30° C. under reduced pressure on a rotary evaporator. The resulting liquid can then be purified by vacuum distillation to yield a product of propanoic acid, 2-bromo-2-methyl-, 3-(trimethylsilyl)-2-propynyl ester), a protected alkyne-functional initiator for atom transfer radical polymerization (ATRP). $^1$H-NMR δ 4.78 (s, 2H, C($\underline{H}_2$), 1.94 (s. 6H, $CH_3$), 0.08 (s, 9H, Si(C($\underline{H}_3$)$_3$. $^{13}$C NMR δ 171.77 (C($\underline{C}$(O)O), 90.03 (Si-($\underline{C}$≡C), 98.55 (($\underline{C}$≡C-Si), 55.88 (O($\underline{C}$C(O)), 54.56 (($\underline{C}$(CH$_3$)$_2$), 31.01 (($\underline{C}$H$_3$), −0.83 (($\underline{C}$H$_3$Si).

The HetBi polymers described herein can be readily prepared by any method known in the art, including those methods described in Example 1.

In certain embodiments, the polymer backbone can be an αtrimethylsilyl alkyne-β-azide-poly(styrene) backbone, an αtrimethylsilyl alkyne-β-azide-poly(tert-butyl acrylate) backbone or an αtrimethylsilyl alkyne-β-azide-poly(methyl methacrylate) backbone. Accordingly, in certain embodiments, the HetBi polymer used in conjunction with the methods described herein can be an αtrimethylsilyl alkyne-β-azide-poly(styrene) terminated at one end with an azide group ($N_3$) and on the other end with a trimethylsilyl protected alkyne group (TMS-≡) (TMS-alkyne-PS-$N_3$), an αtrimethylsilyl alkyne-β-azide-poly (tert-butyl acrylate) terminated at one end with an azide group ($N_3$) and on the other end with a trimethylsilyl protected alkyne group (TMS-≡)(TMS-alkyne-PtBA-$N_3$), or an α-trimethylsilyl alkyne-β-azide-poly(methyl methacrylate) terminated at one end with an azide group ($N_3$) and on the other end with a trimethylsilyl protected alkyne group (TMS-≡)(TMS-alkyne-PMMA-$N_3$). Molecular characteristics of some HetBi polymers suitable for use with the methods described herein are presented in Table 1 and their chemical structures are shown in FIG. 8.

TABLE 1

Number molecular weights ($M_n$), weight average molecular weights ($M_w$) and polydispersity indices (PDI) of the polystyrene, poly(tert-butyl acrylate) and poly(methyl methacrylate) HetBi polymers determined by gel permeation chromatography (GPC). Adjusted $M_n$ values employ a universal calibration based upon literature values of Mark-Houwink-Sakurada parameters to correct the GPC molecular weight for hydrodynamic volume effects.

| Polymer Code | $M_n$ | $M_w$ | PDI | Adjusted $M_n$ |
| --- | --- | --- | --- | --- |
| TMS-alkyne-PS-$N_3$ | 21,500 | 24,000 | 1.12 | 21,500 |
| TMS-alkyne-PtBA-$N_3$ | 17,000 | 20,000 | 1.17 | 22,170 |
| TMS-alkyne-PMMA-$N_3$ | 12,000 | 20,000 | 1.67 | 14,600 |

The HetBi polymers suitable for use with the methods described herein can comprise any polymer backbone terminated at one end with an azide group ($N_3$) and on the other end with a trimethylsilyl protected alkyne group (TMS-≡) and can have any type of polymer backbone (e.g., charged or functional) can be employed using click chemistry in CLbL assembly. One skilled in the art will understand that the type of polymer backbone selected for use can be selected from a range of polymer backbones depending on the intended end use of the multilayer polymer composition generated by the methods described herein. Exemplary polymer backbones suitable for use with the methods described herein include, but are not limited to polymers, copolymers, polyelectrolyte polymers such as poly(acrylic acid) and poly(lysine), polyethers such as polyethylene glycol, polyesters such as poly (acrylates) and poly(methacrylates), polyalcohols such as poly(vinyl alcohol), polyamides such as poly(acrylamides) and poly(methacrylamides), biocompatible polymers, biodegradable polymers, polypeptides, polynucleotides, polycarbohydrates and lipopolymers.

In one embodiment, the same polymer material can be used in each polymer monomolecular layer. In another embodiment, different polymer materials can be used for each polymer monomolecular layer. Further, one skilled in the art will understand that the use of one polymer in a given monomolecular layer of the multilayer polymer composition generated by the methods described herein will not preclude the use of the same polymer in another monomolecular layer of the multilayer polymer composition.

Examples of polymers backbones suitable for use with the methods described herein, include, but are not limited to organic polymers, polymer precursors, thermoplastic polymers, a blend of thermoplastic polymers, thermosetting polymers or any combination thereof. The substrate can also comprise a blend of polymers, copolymers, terpolymers, and can be a oligomer, a homopolymer, a copolymer, a block copolymer, an alternating block copolymer, a random polymer, a random copolymer, a random block copolymer, a graft copolymer, a star block copolymer, a dendrimer, or the like.

Exemplary thermoplastic polymers that can be used as polymer backbones for the HetBi polymers described herein, include, but are not limited to acrylonitrile butadiene styrenes, acrylics, celluloids, cellulose acetates, cycloolefin copolymers, ethylene-vinyl acetates, ethylene vinyl alcohols, fluoroplastics, ionomers, polyacetals, polyacrylates, polyacrylonitriles, polyamides, polyamide-imides, polyaryletherketones, polybutadienes, polybutylenes, polybutylene terephthalates, polycaprolactones, polychlorotrifluoroethylenes, polyethylene terephthalates, polycyclohexylene dimethylene terephthalates, polycarbonates, polyhydroxyalkanoates, polyketones, polyesters, polyethylenes, polyetheretherketones, polyetherketoneketones, polyetherimides, polyethersulfones, polyethylenechlorinates, polyimides, polylactic acids, polymethylpentenes, polyphenylene oxides, polyphenylene sulfides, polyphthalamides, polypropylenes, polystyrenes, polysulfones, polytrimethylene terephthalates, polyurethanes, polyvinyl acetates, polyvinyl chlorides, polyvinylidene chlorides, styrene-acrylonitriles or any combination thereof.

Examples of cationic polymers that can be used as polymer backbones for the HetBi polymers described herein are any polymers having protonated heterocycles attached as pendant groups and include, but are not limited to polyethylene glycol poly-L-lysine (PLL), poly(D-lysine), poly(ornithine), poly (arginine), poly(histidine), nonpeptide polyamines such as poly(aminostyrene), poly(aminoacrylate), poly(N-methyl aminoacrylate), poly(N-ethylaminoacrylate), poly(N,N-dimethyl aminoacrylate), poly(N,N-diethylaminoacrylate), poly (aminomethacrylate), poly(N-methyl amino-methacrylate), poly(N-ethyl aminomethacrylate), poly(N,N-dimethyl aminomethacrylate), poly(N,N-diethyl aminomethacrylate), poly(ethyleneimine), polymers of quaternary amines, such as poly(N,N,N-trimethylaminoacrylate chloride), poly(methyacrylamidopropyltrimethyl ammonium chloride), and natural or synthetic polysaccharides such as chitosan.

Examples of anionic polymers that can be used as polymer backbones for the HetBi polymers described herein are any polymer having carboxylic acid groups attached as pendant groups and include, but are not limited to alginate, carrageenan, furcellaran, pectin, xanthan, hyaluronic acid, heparin, heparan sulfate, chondroitin sulfate, dermatan sulfate, dextran sulfate, poly(meth)acrylic acid, oxidized cellulose, carboxymethyl cellulose and crosmarmelose, synthetic polymers and copolymers containing pendant carboxyl groups, and polyaminoacids of predominantly negative charge, such as polyaspartic acid, polyglutamic acid, and copolymers thereof.

Examples of nonionic polymers that can be used as polymer backbones for the HetBi polymers described herein are uncharged polymers or from a combination of charged and uncharged polymers and include, but are not limited to dextran, dextran sulfate, diethylaminoethyl (DEAE)-dextran, hydroxyethyl cellulose, ethyl(hydroxyethyl)cellulose, acrylamide, polyethylene oxide, polypropylene oxide, polyethylene oxide-polypropylene oxide copolymers, $PAAN_a$, Ficoll, polyvinylpyrrolidine, and polyacrylic acid.

Examples of amphoteric polymers that can be used as polymer backbones for the HetBi polymers described herein are include, but are not limited to acrylic acid (AA), DMAEMA (dimethylaminoethyl methacrylate), APA (2-aminopropyl acrylate), MorphEMA (morpholinoethyl methacrylate), DEAEMA (diethylaminoethyl methacrylate), t-ButylAEMA (t-butylaminoethyl methacrylate), PipEMA (piperidinoethyl methacrylate), AEMA (aminoethyl methacrylate), HEMA (2-hydroxyethyl methacrylate), MA (methyl acrylate), MAA (methacrylic acid) APMA (2-aminopropyl methacrylate), AEA (aminoethyl acrylate).

Polysaccharide can also be used as polymer backbones for the HetBi polymers described herein. Exemplary polysaccharide suitable for use with the methods disclosed herein include, but are not limited to, starch, cellulose, glycogen or carboxylated polysaccharides such as alginic acid, pectin, carboxymethyl amylose, hyaluronan or carboxymethylcellulose.

The use of non-linear polymer backbones can be to increase the areal density of functional groups at an interface of interest. For example, if the areal density of surface functional groups is insufficient to attach a subsequent monomolecular layer, it can be increased by addition of a monomolecular layer of click functional dendrimers. As used herein, the term dendrimer refers to any poly armed polymer, and can includes dendrimers having defects in the branching structure, dendrimers having an incomplete degree of branching, crosslinked and uncrosslinked dendrimers, asymmetrically branched dendrimers, star polymers, highly branched polymers, highly branched copolymers and/or block copolymers of highly branched and not highly branched polymers. Examples of dendrimers that can be used as polymer backbones for the HetBi polymers described herein include, but are not limited to poly(propyleneimine) (DAB) dendrimers, benzyl ether dendrimers, phenylacetylene dendrimers, carbosilane dendrimers, convergent dendrimers, polyamine, multi-armed PEG polyamide dendrimers as well as dendrimers described in U.S. Pat. Nos. 4,507,466, 4,558,120, 4,568,737 and 4,587,329, each of which of which are incorporated herein by reference in their entireties. Also suitable for use as polymer backbones for the HetBi polymers described herein include dendrimers described in Dendritic Molecules, Concepts, Syntheses, Perspectives. Newkome, et al., VCH Publishers, Inc. New York, N.Y. (1996).

Other polymers suitable for use as polymer backbones for the HetBi polymers described herein include polymers having hydrolysable or biochemically cleavable groups incorporated into the polymer network structure. Exemplary polymers having hydrolysable or biochemically cleavable groups incorporated into the polymer network structure include but are not limited to those polymers having hydrolysable or biochemically cleavable groups incorporated into the polymer network structure described in U.S. Pat. Nos. 5,626,863, 5,844,016, 6,051,248, 6,153,211, 6,201,065, 6,201,072, each of which of which are incorporated herein by reference in their entireties.

Other polymers can also be used as polymer backbones for the HetBi polymers described herein. Exemplary other polymers suitable for use with the methods disclosed herein include, but are not limited to, ABS polycarbonate polymer blends, acetal homopolymers, acrylate and methacrylate resins, acrylic fibers, acrylic polyelectrolytes, acrylic resins, acrylonitrile-butadiene-styrene copolymers, acrylonitrile-butadiene-styrene graft copolymers, acrylonitrile-butadiene-styrene terpolymers, acrylonitrile-polybutadiene-styrene graft copolymers, ampholytic polyelectrolytes, aromatic polyamides, aromatic polyesters, butadiene copolymers, butadiene-acrylonitrile copolymers, carboxylated fluoropolymers, cellulose acetates, cellulose acetate-butyrates, cellulose acetate-propionates, cellulose nitrates, cellulose nitrate plasticized with camphors, cellulose propionates, chlorinated natural rubbers, chlorinated polyethylenes, chlorinated rubbers, cis-1,4-polybutadienes, cis-1,4-polyisoprenes, copolyamides, copolyester based on 1,4-cyclohexylene glycol and a mixture of terephthalic and isophthalic acids, copolymer from 90% isobutylene and 10% styrene, copolymers of vinylidene chloride, vinyl chloride and acrylonitriled, diallyl phthalate resins, elastomeric polyamides, copolyamides, epichlorohydrin rubbers, epoxide resins, epoxy resins, ethylcelluloses, ethylene-chlorotrifluoroethylene copolymers, ethylene-methyl acrylate copolymers, ethylene-propylene copolymers, ethylene-propylene-diene terpolymers, ethylene-vinylacetate copolymers, farbenfabrik ion-exchange resins, fatty polyamides, fluoroelastomers, fluoropolymers, glass-reinforced poly(ethylene terephthalate), hydroxyethylcelluloses, ion-exchange resins, ionic membrane (based on fluoropolymer), ionomers, liquid crystal polymers, LLDPE, low-density polyethylenes, melamine-formaldehyde resins, melamine-formaldehyde resins, methyl celluloses, modified polypropylenes, nylon-11, nylon-12, nylon-6, nylon-6,6, PE, cross-linked by radiation, perfluoroalkoxy copolymers, persulfonated fluoropolymers, petrochemcial polypropylenes, phenol-formaldehyde resins, phenol-formaldehyde resins and molding compounds, photopolymer systems, polyesters, polimides, poly(ethylene terephthalate), poly(methyl methacrylate) dental resins, poly (vinyl alcohol) fibers, poly(butylenes terephthalate), poly (ethylene oxide), poly(ethylene terephthalate), poly(methyl methacrylate), poly(m-phenylene isophthalimide), poly(phenylene oxide) blends, poly(phenylene oxide)-polystyrene blends, poly(p-hydroxybenzoic acid ester), poly(tetramethylene terephthalate), poly(vinyl acetate), poly(vinyl alcohol), poly(vinyl butyral), poly(vinyl chloride), poly(vinyl chloride) (PVC), poly(vinyl chloride) and blends, poly(vinyl fluoride), poly(vinyl fluoride), poly(vinyl isobutyl ether), poly (vinylidene fluoride), poly-4-methylpent-1-ene, polyacetals, polyacrylates, polyacrylic esterimides, polyacrylonitriles, polyamides, polyamide fiber from bis(paminocyclohexyl) methane and dodecanedioic acids, polyamide/abs blends, polyamide-imides, polyarylatess, polyaryletherketones, polyaryletherketones, polyarylethersulfones, polyarylsulfones, polybismaleinimides, polybutadienes, polycarbonates, polycarbonate/abs blends, polychloroprenes, polychlorotrifluoroethylenes, polyesters, polyesterimides, polyether ketones, polyether sulfones, polyetherimides, polyethylenes, polyethylene terephthalates, polyethyleneimines, polyethylenes, polyhydroxy compound for isocyanate cross-linking, polyimides, polyisobutylenes, polyisocyanurates, polyisoprenes, polyoxymethylenes, polyphenylene ethers, polyphenylene sulfides, polyphenyleneethers, polypropylenes, polystyrenes, polysulfides, polysulfones, polytetrafluoroethylenes, polyurethanes, polyvinylidene fluorides, rubber hydrochlorides, silicones, spandex fibers, styrene homopolymers, styrene-acrylonitrile copolymers, styrene-butadiene copolymers, styrene-diene-styrene triblock elastomers, styrene-polybutadiene graft copolymers, sulfochlorinated polyethylenes, tetrafluorethylene-propylene+cure site monomer terpolymers, tetrafluoroethylene-ethylene copolymers, tetrafluoroethylene-hexafluoropropylene copolymers, thermoplastic polyester elastomers, thermoplastic polyurethane elastomers, thermoplastic polyurethanes, thermoplastic styrene block copolymers, trans-1,4-polybutadienes, transparent amorphous polyamides, transparent polyamides, unsaturated polyester resins, urea-formaldehydes, vinyl chloride-acrylonitrile copolymers, vinyl chloride-vinylidene chloride-acrylonitrile copolymers, vinylidene fluoride-chlorotrifluoroethylene copolymers, vinylidene fluoride-hexafluoropropylene copolymers, and vinylidene fluoride-hexafluoropropylene-tetrafluoroethylene terpolymers.

The molecular weights of the HetBi polymers described herein can be of any molecular weight suitable for use in generating and using the multilayer polymer compositions described herein. In certain embodiments, the HetBi polymers can have a molecular weight of from about 2,000 kDa to about 2,000,000 Da. In certain embodiments, the molecular weight of the HetBi polymer is about 5 kDa to about 10 kDa; about 10 kDa to about 20 kDa; about 20 kDa to about 30 kDa; about 30 kDa to about 40 kDa; about 40 kDa to about 50 kDa; about 50 kDa to about 75 kDa; about 75 kDa to about 100 kDa; about 100 kDa to about 200 kDa; about 200 kDa to about 250 kDa; about 250 kDa to about 300 kDa; about 300 kDa to about 350 kDa; about 350 kDa to about 400 kDa; about 400 kDa to about 450 kDa; about 450 kDa to about 500 kDa; about 500 kDa to about 550 kDa; about 550 kDa to about 600 kDa; about 600 kDa to about 650 kDa; about 650 kDa to about 700 kDa; about 700 kDa to about 750 kDa; about 750 kDa to about 800 kDa; about 800 kDa to about 850 kDa; about 850 kDa to about 900 kDa; about 900 kDa to about 950 kDa; about 950 kDa to about 1 kDa; about 1,000 kDa to about 1,500 kDa; or about 1,500 kDa to about 2,000 kDa, where any stated values can form a lower and/or upper endpoint of a molecular weight range as appropriate or where any of the lower limits can be combined with any of the upper limits.

The molecular thickness of the multilayer polymer compositions described herein can be of any thickness and may in part be dictated by the end use application of the multilayer polymeric composition. In some embodiments, the multilayer polymer composition can have a thickness from about 1 nm to about 100 nm, from about 2 nm to about 50 nm, from about 3 nm to about 25 nm, from about 4 nm to about 15 nm, from about 5 nm to about 10 nm. In some embodiments, the multilayer polymer composition can have a thickness from about 1 nm, about 2 nm, about 3 nm, about 4 nm, about 5 nm, about 6 nm, about 7 nm, about 8 nm, about 9 nm, about 10 nm, about 11 nm, about 12 nm, about 13 nm, about 14 nm, about 15 nm, or about 16 nm or greater.

In certain embodiments, the multilayer polymer compositions can include a polymer comprising one or more effector moieties. In certain embodiments the hetero-bifunctional polymer in one or more monomolecular layers of the multilayer polymer compositions comprises an effector moiety. In certain embodiments, the multilayer polymer compositions can include a surface monomolecular layer comprising a polymer comprising one or more effector moieties. As used herein, the term "surface monomolecular layer" refers to the surface mononuclear layer formed after deposition of a hetero-bifunctional polymer according to the methods disclosed herein. In one embodiment, the hetero-bifunctional polymer in a surface monomolecular layer will have at least one terminus which is not covalently bound to a substrate or to another hetero-bifunctional polymer. In one embodiment, the at least one terminus of the hetero-bifunctional polymer in a surface monomolecular layer that is not covalently bound to a substrate or to another hetero-bifunctional polymer is a trimethylsilyl protected alkyne group terminus.

The effector moiety can be any type of molecule. For example, the effector moiety can be a polypeptide (e.g. an enzyme or an antibody or a fragment thereof), an oligonucleotide, a lipid, a carbohydrate, a small molecule, a drug, a ligand, a catalyst, a dye, a label, a sensor, an analyte or any combination thereof. In some embodiments, the effector moiety functions as a cleavable group. In some embodiments, the effector moiety functions as a binding site. In other embodiments, the effector moiety can be a thermochemically reactive group, a photochemically reactive group, or mixtures thereof. Suitable thermochemically reactive group and photochemically reactive groups are described in U.S. Pat. Nos. 5,858,653 and 6,465,178 and in U.S. Published Patent Application 20030113792 (Ser. No. 09/521,545), the disclosures of which are incorporated herein by reference.

Many methods for attaching effector moieties to polymer backbones are known in the art and any suitable method can be used. Suitable methods include, but are not limited to those described in Lvov et al, J. Phys. Chem., 1993, 97, 13773; Lvov et al, Langmuir, 1996, 12, 3038; Cooper, et al, Langmuir, 1995, 11, 2713; Locklin et al, Langmuir, 2002, 18, 877; Zhang et al, Chem. Commun., 2007, 1395.; Sukhorukov et al, Colloids Surf., A, 1998, 137, 253; Lvov and Caruso, Anal. Chem., 2001, 73, 4212; Crisp and Kotov, Nano Lett., 2003, 3, 173; Lvov et al, Macromolecules, 1993, 26, 5396; Onda et al, Biotechnol. Bioeng., 1996, 51, 163; Caruso et al, Langmuir, 2000, 16, 9595; Schuler and Caruso, Biomacromolecules, 2001, 2, 921; Cortez et al, Adv. Mater., 2006, 18, 1998, each of which are incorporated by reference in their entirety.

In some embodiments, the effector moiety is a biologically active molecule. Exemplary biologically active molecules that can serve as an effector moiety in the multilayer polymer compositions described here include, but are not limited to anti-inflammatory agents, anti-pyretic agents, steroidal and non-steroidal drugs for anti-inflammatory use, hormones, growth factors, contraceptive agents, antivirals, antibacterials, antifungals, analgesics, hypnotics, sedatives, tranquilizers, anti-convulsants, muscle relaxants, local anesthetics, antispasmodics, antiulcer drugs, peptidic agonists, sympathomimetic agents, cardiovascular agents, antitumor agents, oligonucleotides and their analogues and so forth.

In some embodiments, the effector moiety is a polynucleotide probe useful for binding or detecting a polypeptide, or another polynucleotide. Accordingly, in some embodiments, the multilayer polymer compositions can be used as a DNA microarray suitable for detecting hybridization of complementary target DNA or DNA fragments in solution. In some embodiments, the effector moiety is an antibody useful for binding a polypeptide. Accordingly, in some embodiments, the multilayer polymer compositions can be used as an immunoarray suitable for detecting binding of an antigen to the effector moiety on the surface of the multilayer polymer compositions described herein.

In a further embodiment, the effector moiety is a fluorescence dye or a label (e.g. a fluorophore). Exemplary fluorescence dyes or labels that can serve as an effector moiety in the multilayer polymer compositions described here include but are not limited to, cresyl fast violet, cresyl blue violet, rhodamine-6G, para-aminobenzoic acid, phthalic acids, erythrosine, aminoacridine. fluorescein and its derivatives; rhodamine and its derivatives; cyanine and its derivatives; coumarin and its derivatives; Cascade Blue and its derivatives; Lucifer Yellow and its derivatives; BODIPY and its derivatives; and the like. Exemplary fluorophores include indocarbocyanine (C3), indodicarbocyanine (C5), Cy3, Cy3.5, Cy5, Cy5.5, Cy7, Texas Red, Pacific Blue, Oregon Green 488, Alexa Fluor 488, Alexa Fluor 532, Alexa Fluor 546, Alexa Fluor 568, Alexa Fluor 594, Alexa Fluor 647, Alexa Fluor 660, Alexa Fluor 680, JOE, Lissamine, Rhodamine Green, BODIPY, fluorescein isothiocyanate (FITC), carboxy-fluorescein (FAM), phycoerythrin, rhodamine, dichlororhodamine (dRhodamine), carboxy tetramethylrhodamine (TAMRA), carboxy-X-rhodamine (ROX), LIZ, VIC, NED, PET, SYBR, PicoGreen, RiboGreen, and the like. Descriptions of fluorophores and their use, can be found in, among other places, R. Haugland, Handbook of Fluorescent Probes and Research Products, 9$^{th}$ ed. (2002), Molecular Probes, Eugene, Oreg.; M. Schena, Microarray Analysis (2003), John Wiley & Sons, Hoboken, N.J.; Synthetic Medicinal Chemistry 2003/2004 Catalog, Berry and Associates, Ann Arbor, Mich.; G. Hermanson, Bioconjugate Techniques, Academic Press (1996); and Glen Research 2002 Catalog, Sterling, Va. Near-infrared dyes are expressly within the intended meaning of the terms fluorophore and fluorescent reporter group.

The methods described herein can also be used to manufacture patterned multilayer polymer compositions. Any method for generating a patterned surface known in the art can be used in conjunction with the methods described herein. For example, nanoimprint lithography can be used to deposit one or more of the HetBi polymers described herein to produce a heterogeneous multilayer polymer composition wherein different regions of the substrate can be coated with different numbers number of polymer monomolecular layers or be coated with different HetBi polymers. Nanoimprint lithography can also be used for differential deposition of polymer comprising one or more effector moieties to generate a heterogeneous surface effector layer on the substrate. For example, the methods and compositions described herein can be used for generating a surface having a gradient in effector moieties or HetBi polymer monomolecular layers, wherein the density of a particular effector moiety or HetBi polymer monomolecular layer can be varied across the substrate.

In certain embodiments, the patterned multilayer polymer compositions have random heterogeneous compositions, ordered heterogeneous compositions or any combination thereof. For example, certain regions of the substrate can be coated with multilayer polymer composition having distinct densities, thicknesses, effector moieties or any other suitable physical properties to differentiating heterogeneous regions of the multilayer polymer compositions described herein.

The multilayer polymer compositions described herein can be organic films comprising highly structured multilayers having specific properties. For example, the multilayer polymer compositions described herein can be designed to withstand thermal or environmental challenges. The uses of the multilayer polymer compositions include nanotechnology applications in fields including, but not limited to medicine and photonics. The methods described herein can be used to generate multilayer polymer compositions suitable for use as biologically active surfaces, integrated optics (Baur, et al, Adv. Mater. 10, 1452-1455 (1998)), sensors (Wells et al, Langmuir 12, 1989-1996 (1996)), friction-reducing coatings, gas separation (Levaesalmi and McCarthy, Macromolecules 30, 1752-1757 (1997)), carriers or delivery devices for bioactive agents, biological arrays (Heller, Annu Rev. Biomed. Eng. 4, 129-153 (2002)).

The methods and compositions described herein can be used in the manufacture of a wide variety of articles, which include, but are not limited to microfluidic devices, non-fouling surfaces, low friction surfaces (e.g. to reduce wear on the surface), low adhesion surfaces (e.g. "non-stick" surfaces), hydrophobic surfaces, microfluidic channels, circuit boards, analytical devices, optically active surfaces (e.g. thin organic films useful for crystal display applications), sensors, polypeptide sensing arrays, genome sequencing arrays, peptide arrays, DNA sensing arrays, drug discovery arrays and the like. One skilled in the art will readily be capable of selecting one or more polymer backbones or HetBi polymers suitable for a particular application.

Other polymers suitable for use as polymer backbones or HetBi polymers include high temperature resistant polymers, fire resistant polymers, liquid crystal polymers (e.g. thermotropic main chain liquid crustal polymers, side-chain liquid crystal polymers, andral nematic liquid crystal polymers), electroactive polymers (e.g. Filled polymers, inherently conductive polymers, photoconductive polymers, polymers used in fiber optics, Languir-Blodgett Films, Piezo- and pyroelectric polymers and polymeric electrolytes), polymers in photoresist applications (e.g. negative photoresists, positive resists, electron beam resists, and plasma-developable photoresists), photoresists used in applications for printing (e.g. polymers used in printing plates, polymers used in photoengraving, polymers used in printed circuits, polymers used in collotype and proofing systems), polymers used in optical information storage, polymers used in adhesives (e.g. solvent-based adhesives, water-based adhesives, hot melt adhesives, radiation-curable adhesives), degradable polymers (e.g. polymers used in packaging applications, polymers used in medical and related applications), ionic polymers (e.g. ionomers, and polyelectrolytes), scavenger resins, synthetic polymer membranes (e.g. polymers used in membrane preparation and polymers used in membrane modules), polymers used in hydrogels (e.g. smart polymers), dendritic polymers, shape memory polymers, microencapsulation polymers, polymer nanocomposites, wood-polymer composites, and polymerization-filed composite as well as polymers described in Industrial Polymers, Specialty Polymers, and Their Applications, By Manas Chanda, Salil K. Roy CRC Press, 2008, which is included by reference in its entirety.

The following examples illustrate the present invention, and are set forth to aid in the understanding of the invention, and should not be construed to limit in any way the scope of the invention as defined in the claims which follow thereafter.

EXAMPLES

Example 1

A Versatile Method for Covalent Layer by Layer Assembly of Thin Organic Films

The method for covalent layer by layer assembly (CLbL) is described in FIG. 1. An element in the strategy is the synthesis of heterobifunctional (HetBi) polymers that are terminated at one end with an azide group ($N_3$) and on the other end with a trimethylsilyl protected alkyne group (TMS-≡) as depicted in FIG. 1. HetBi functional polymers of this nature can be readily prepared by atom transfer radical polymerization (ATRP) (Wang and Matyjaszewski. Macromolecules 28, 7901-7910 (1995)), a living radical polymerization technique, as described herein. In one embodiment, the CLbL method begins by functionalizing the substrate with surface alkyne groups (≡). This may be accomplished by self-assembly of alkyne-functional phosphonate esters (White et al, J. Am. Chem. Soc. 128, 11356-11357 (2006)) (for metal oxide substrates), alkyne-functional thiols (for gold substrates) (Troughtoyt et al, J. Am. Chem. Soc. 111, 321-335 (1989)), alkyne-functional silanes (for glass substrates) (Netzer and Sagiv, J. Am. Chem. Soc. 105, 674-676 (1983)) or alkyne-functional block copolymers (Rengifo et al, Langmuir 24, 7450-7456 (2008); Chen et al, Biomacromolecules 9, 2345-2352 (2008)) (for glass and polymeric substrates).

Covalent deposition of the first monomolecular layer involves a "click" reaction (i.e., 1,3-dipolar cycloaddition) between azide termini on the HetBi Polymer 1 and alkyne groups on the functionalized substrate surface. The result of the first reaction process is a substrate coated with a covalently bound monolayer of Polymer 1 that presents protected alkyne groups (TMS-≡) at the surface. An alkyne functional surface (≡)is then regenerated by deprotection of the protected alkyne groups. Once surface alkyne groups are regenerated, a second monomolecular layer of a HetBi Polymer 2 (where the HetBi Polymer 2 is not necessarily the same as that used for the first monomolecular layer) is covalently attached by a click reaction between azide termini of HetBi polymer 2 with the regenerated surface alkyne groups. The layering process can be applied to prepare covalently bound multilayers from any desired sequence of polymers by repeating this process (the deposition of four distinct polymer monomolecular layers is illustrated in FIG. 1). Each monomolecular layer can be formed in two steps: one first step involving the covalent deposition of a monomolecular layer of HetBi polymer and another step involving a subsequent deprotection to regenerate surface alkyne groups.

Three HetBi polymers were synthesized to illustrate the method: αtrimethylsilyl alkyne-β-azide-poly(styrene) (TMS-alkyne-PS-$N_3$) and αtrimethylsilyl alkyne-β-azide-poly(tert-butyl acrylate) (TMS-alkyne-PtBA-$N_3$) and αtrimethylsilyl alkyne-β-azide-poly(methyl methacrylate) (TMS-alkyne-PMMA-$N_3$). These polymers can be readily prepared by use of a trimethylsilyl protected alkyne-functional ATRP initiator to polymerize the monomers. Conversion of the resultant terminal bromine groups to azides can be performed by the addition of sodium azide.

An initial step in CLbL assembly can be to functionalize the substrate with alkyne groups. For glass and silicon wafer, functionalization was accomplished by forming a self-assembled monolayer (SAM) (Ulman, Chem. Rev. 96, 1553-1574 (1996); Dubois and Nuzzo, Annu Rev. Phys. Chem. 43, 437-463 (1992); Laibinis and Nuzzo, J. Am. Chem. Soc. 113, 7152-7167 (1991); Senaratne and Andruzzi, Ober, Biomacromolecules 6, 2427-2448 (2005)) of an alkyne functional silane on the substrate surface. The thickness of the SAM as determined by angle dependent x-ray photoelectron spectroscopy analysis was 1.8±0.3 nm, while the thickness as measured by ellipsometry was 1.7±0.2 nm. From the structure of the silane, the thickness is expected to be about 1.1 nm. Similar silanes with 4 to 7 methylene units have a reported thickness of 1.5 to 2.3 nm (Pantano and Wittberg, Surface and Interfaces Anal. 15, 498-501 (1990)). The finding that these SAMs are thicker than expected is consistent with previous studies of other silanes that report their polymerization to form multilayers (Dibenedetto, Materials Science and Engineering A302, 74-82 (2001)). The water contact angle of the alkyne functionalized substrate was 61.8±1°, compared to <10±2° for the bare glass substrate.

A first step in each monomolecular deposition cycle was to covalently bond a monomolecular layer of HetBi polymer to the alkyne functionalized substrate. To accomplish this, each HetBi polymer was dissolved in toluene and spin coated onto the surface. The coated substrates were placed in a vacuum oven and heated to 100-115° C. for 3-12 hours to effect a thermally initiated "click" reaction between substrate-bound alkyne groups and the azide termini of the polymers (Seo et al, J. Org. Chem. 68, 609-612 (2003)). Click reactions proceed to high conversion under mild conditions with no side reactions or byproducts and the resulting aromatic triazole is extremely stable (Krivopalov and Shkurko, Russ. Chem. Rev. 74, 339-379 (2005)). In addition, click reactions are chemoselective such that virtually any polymer backbone may be used in the CLbL process without interfering with the click reactions used to bond adjacent monomolecular layers. After the reaction period, excess polymer was removed by extensive washing with solvent (DCM) for 1 to 24 hours.

A second step of the macromolecular deposition cycle was to regenerate substrate bound alkyne groups by deprotection of the terminal TMS-alkyne groups. This was accomplished by dipping the substrate into a $K_2CO_3$ saturated solution of 10:1 DCM/MeOH. The regenerated alkyne surface was then used to couple additional macromolecular layers by repeating the two-step deposition cycle with other HetBi polymers. The result of multiple deposition cycles was a multilayer assembly in which each monomolecular layer is covalently bonded to both the previous and following monomolecular layers as illustrated in FIG. 1. The stability of the TMS protecting groups was verified by a control experiment in which an addition monomolecular layer was coupled onto a polymer-modified surface was not subjected to the deprotection step. The thickness did not change when the deprotection step was omitted, indicating that no reaction occurred and that the TMS protecting groups are stable under the conditions used to affect the thermal click reaction.

One test of the CLbL method was to validate the assembly of multiple monomolecular layers of TMS-alkyne-PS—$N_3$. Successful sequential deposition of polystyrene monomolecular layers is indicated by the thickness data in FIG. 2. When the first monomolecular layer of PS is deposited onto the alkyne-silane functionalized substrate, surface alkyne groups are in excess and the covalently bound PS forms a polymer brush with a thickness of about 4 nm. If each PS molecule forms a cube with the density of bulk PS, the thickness of a monomolecular layer will be about 3.2 nm. Polystyrene chains in the first monomolecular layer assume relatively extended configurations. This is consistent with the results of previous studies of polystyrene brushes prepared by end-grafting from the melt. (Luzinov et al, Macromolecules 33, 1043-1048 (2000)) The thicknesses for the second through fourth PS monomolecular layers are linearly dependent on the number of monomolecular layers, with each PS monomolecular layer adding about 2 nm to the overall film thickness.

The thickness of each PS monomolecular layer remains unchanged in the multilayer structures. This occurs because the conversion of the interfacial click reactions is effectively complete for each deposition cycle. When a monomolecular layer deposits on the substrate, the areal density of alkyne groups produced is at most the same areal density of alkyne groups in the preceding monomolecular layer. If the conversion were less than complete, the areal density of alkyne groups and consequently the areal density and thickness of PS chains added would decrease each time a monomolecular layer was added. Complete conversion can be achieved for monomolecular layers prepared in a "grafting to" fashion as is performed herein. Certain attributes of the methods described herein are conducive to this result. First of all, the alkyne group is one of few reactive functional groups that has a low surface tension (estimated to be 26 mN/m by group contribution methods) and can therefore segregate preferentially to the surface in both polymers (Jalbert et al, Macromolecules 30, 4481-4490 (1997)). Secondly, the molecular weight of each monomolecular layer can be identical so that the occupied volume and functional group density of each monomolecular layer the same. Thirdly, each monomolecular layer can comprise the same polymer (e.g. PS), such that there can be significant interpenetration between the surface bound monomolecular layer and the polymer that is reacting to that monomolecular layer. Interpenetration across the interface can increase the effective volume for the interfacial reaction since complementary functional groups can only meet within the zone of interpenetration.

Completion of the reaction for each monomolecular layer can be verified by calculating the areal density of functional groups at the surface of the first PS monomolecular layer and using this value to predict the thickness of subsequent monomolecular layers. The areal density of functional groups for a tethered polymer brush monomolecular layer is given by $$\Sigma = \rho A t / M_n \quad (1)$$

where t, $\rho$ and $M_n$ are the homopolymer density, thickness and homopolymer molecular weight, respectively for the monomolecular layer and A is Avogadro's number. If the conversion is complete, the areal density of each monomolecular layer will be the same, allowing for a prediction of the thickness, $t_i$, of any subsequent monomolecular layer i from the relation $$t_i = \Sigma M_{n,i} / \rho_i A \quad (2)$$

Figure 2:
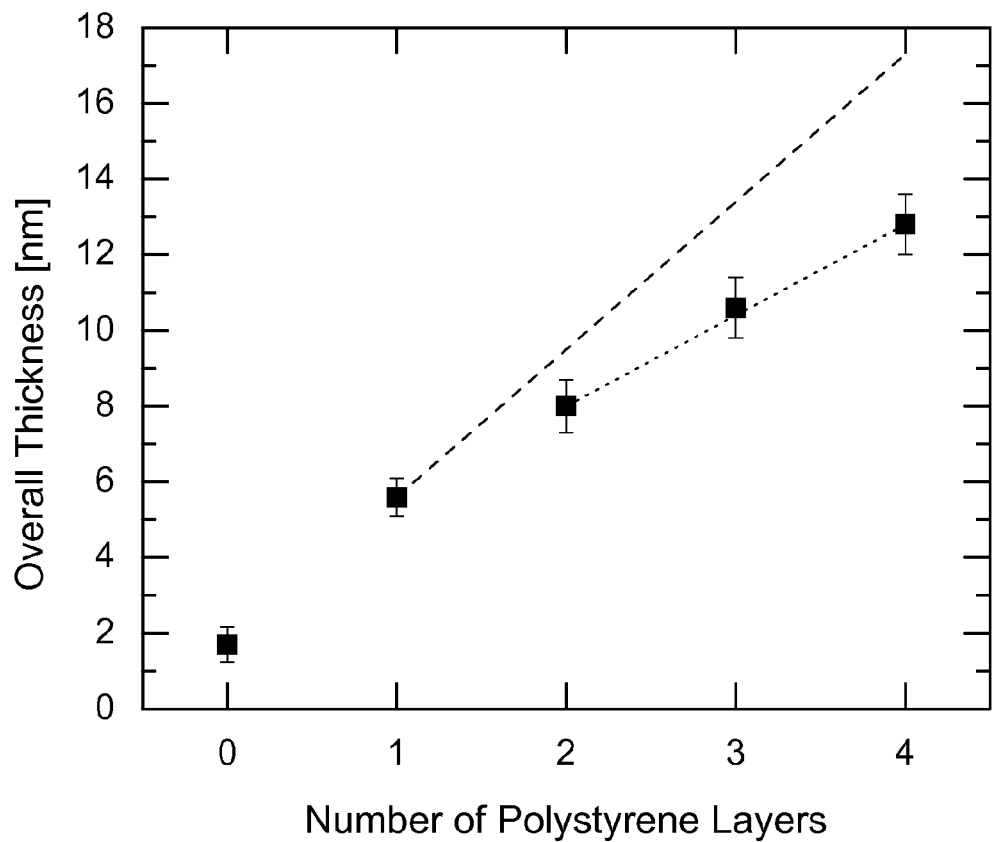
FIG. 2. Ellipsometric thicknesses for covalent layer-by-layer (CLbL) films prepared from α-alkyne-TMS-β-azide-poly(styrene). The dashed line shows predictions based upon the areal density of functional groups in the first layer and the dotted line show predictions based upon the second layer.

The dashed line in FIG. 2 shows the results of thickness predictions based upon the areal density of the first PS monomolecular layer. As can be seen, the data falls below this line, indicating that the conversion for adding the second monomolecular layer is less than complete. Without wishing to be bound by theory, this observation may have several possible origins. Because the silane does not create a perfect monolayer, the calculation of the thickness and thus the areal density of functional groups in the first polymer monomolecular layer could be in error. Also, the failure to achieve complete conversion for the second monomolecular layer could be associated with the fact that the polymers chains in the first monomolecular layer initially assume extended configurations which must reconfigure when they react to the subsequent monomolecular layer. This may influence the nature of the interfacial reaction.

The dotted line in FIG. 2 gives the thickness predictions based upon the areal density of the second PS monomolecular layer. This prediction is in agreement for the thickness of the third and fourth monomolecular layers, indicating that the conversion is complete when these monomolecular layers are added. This enables quantitative prediction of how the thickness will change for any additional PS monomolecular layers from their known molecular weight and the measured areal density of functional groups in the second monomolecular layer.

The linear thickness behavior observed for multiple PS monomolecular layers is not expected for multilayers comprising two distinct polymers or polymers that have the same composition but differ in molecular weight (i.e., molecular volume). Asymmetry in molecular weight (e.g., molecular volume) can cause a mismatch in areal density of the two complementary functional groups that must react across the interface. For example, when a higher molecular weight polymer is added to a monomolecular layer created from a lower molecular weight polymer, functional groups on the substrate (i.e., lower molecular weight monomolecular layer) are in excess, and the higher molecular weight polymer can readily add as a monomolecular layer. If however, the inverse is true, that is, a higher molecular weight monomolecular layer is followed by a lower molecular weight monomolecular layer, functional groups on the substrate are the limiting reactants and functional groups on the lower molecular weight monomolecular layer to be added are in excess. In the latter case a full monolayer of the lower molecular weight polymer cannot form.

Asymmetry in composition, for example in cases where multilayers comprise different polymers, can influence the CLbL process as the width of the interphases between immiscible polymers. This can occur because the interfacial reaction volume is known to depend on the nature of thermodynamic interactions between the two different polymers (Bates and Frederickson, Physics Today 52, 32-38 (1999)).

Figure 3:
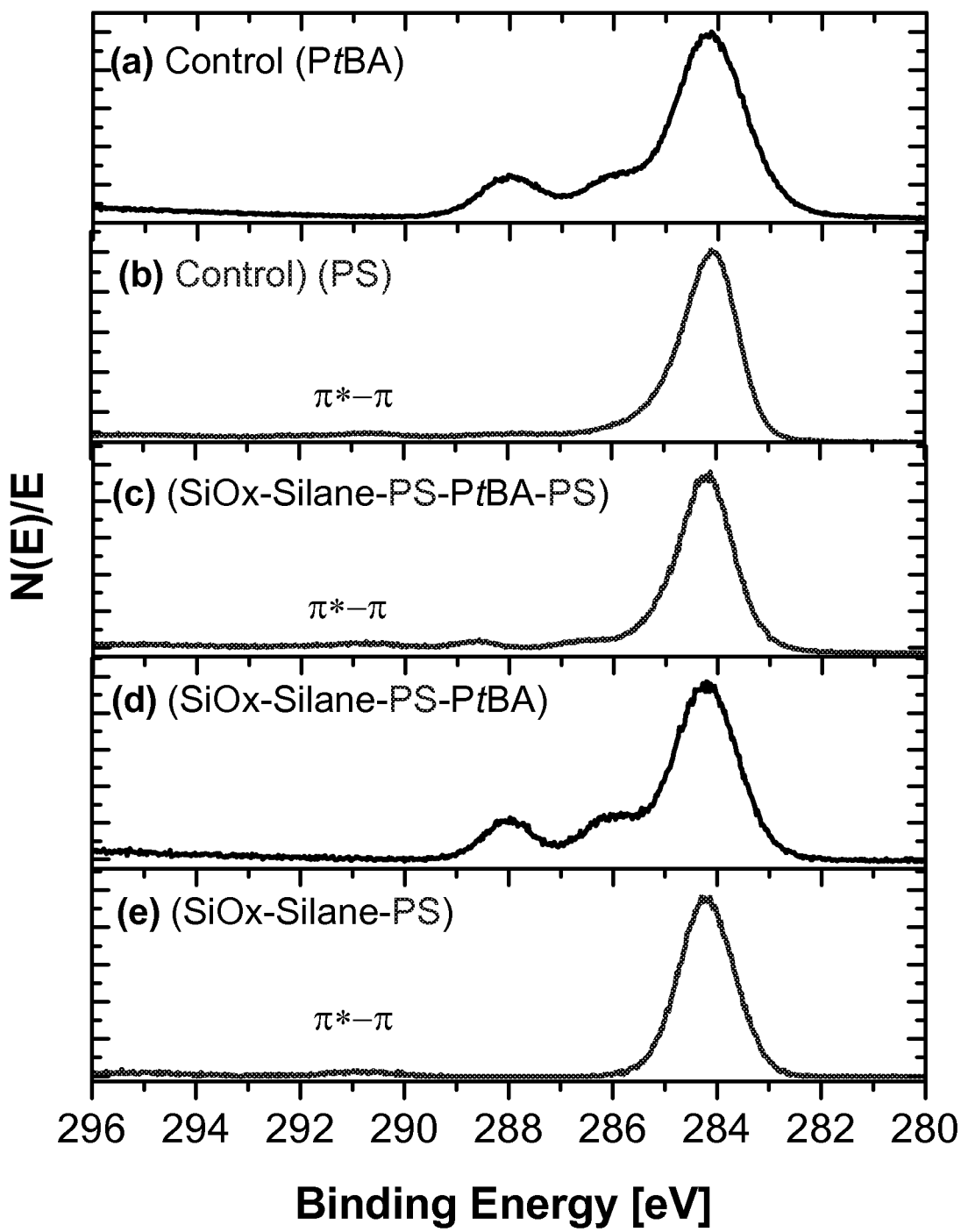
FIG. 3. X-ray Photoelectron Spectroscopy (XPS) high resolution C1s spectra of base polymers (FIG. 3A and FIG. 3B), alkyne-functional substrate (FIG. 3C), and multilayer films (FIG. 3D and FIG. 3E). (15° take off angle)

The effects of asymmetry in molecular size and composition were studied for films comprising alternating monomolecular layers of TMS-alkyne-PS—$N_3$ and TMS-alkyne-PtBA-$N_3$. The deposition of each successive monomolecular layer was confirmed by contact angle, X-ray photoelectron spectroscopy (XPS) and ellipsometry measurements. The results of XPS characterization of multilayers assembled by alternating covalent layer by layer assembly (ACLbL) are shown in FIG. 3. The photoelectrons detected have distinct binding energies associated with the atomic composition of the material being interrogated. The photoelectron spectra associated with carbon 1s orbitals are different for films of pure PtBA and PS due to chemical shifts induced by the presence of oxygen in the PtBA. The peak at 284.6 eV is the unshifted C1s signal arising from carbon atoms bonded to only hydrogen or other carbon atoms. This signal is found in both the PS and PtBA control spectra. In PtBA, the signals associated with carbons bonded to oxygen undergo chemical shifts: the peak centered at 288.8 eV arises from the carbonyl carbon (O—$\underline{C}$=O) in PtBA and the peak near 287.2 eV originates from the ester carbon ($\underline{C}$—O) in PtBA. The $\pi^*$-$\pi$ transition for pure PS is also apparent at ca. 291 eV. An O1s signal from PtBA is also found at 531 eV.

The XPS signals from the layered thin films on glass substrates reflect the polymers used to form the monomolecular layers. The spectrum for the substrate coated with a covalently bonded monomolecular layer of PS (FIG. 2d) is similar to that of the pure PS control (FIG. 2a), including the $\pi^*$-$\pi$ shakeup satellite, confirming successful PS deposition. When a second monomolecular layer of PtBA is added to the substrate, the XPS spectra (FIG. 2e) resembles that of pure PtBA (FIG. 2b). When a third monomolecular layer of PS is added, the spectrum (FIG. 2f) reflects the presence of PS, but also shows signals from PtBA. The presence of PtBA is detected in this case because the thickness of the deposited PS monomolecular layer is not thick enough to screen photoelectrons emanating from the underlying PtBA monomolecular layer.

Figure 4:
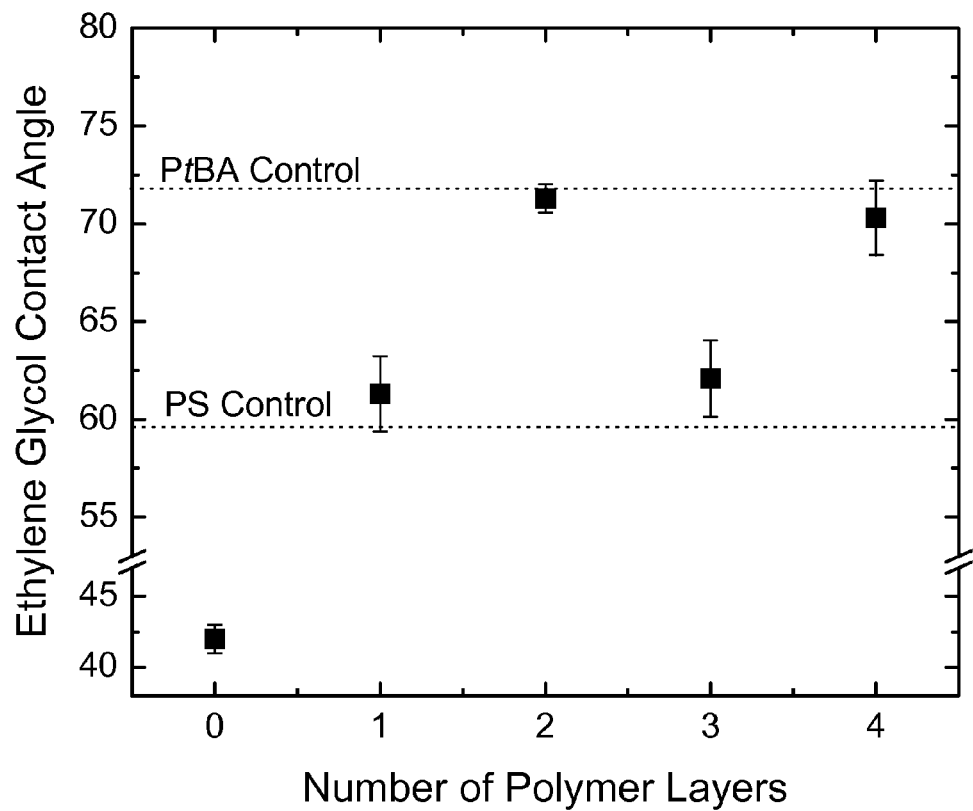
FIG. 4. Ethylene glycol contact angles for CLbL films consisting of alternating polystyrene (PS) (layers 1 and 3) and poly(tert-butyl acrylate) (PtBA) (layers 2 and 4) monomolecular layers. The dashed lines indicate the contact angles for pure PtBA and PS, respectively.

The contact angle data shown in FIG. 4 confirm that covalently bonded multilayer films can be built up by successive deposition of alternating TMS-alkyne-PS—$N_3$ and TMS-alkyne-PtBA-$N_3$ monomolecular layers. Both PtBA and PS monomolecular layers present ethylene glycol contact angles that are similar to those of the corresponding homopolymer controls.

Figure 5:
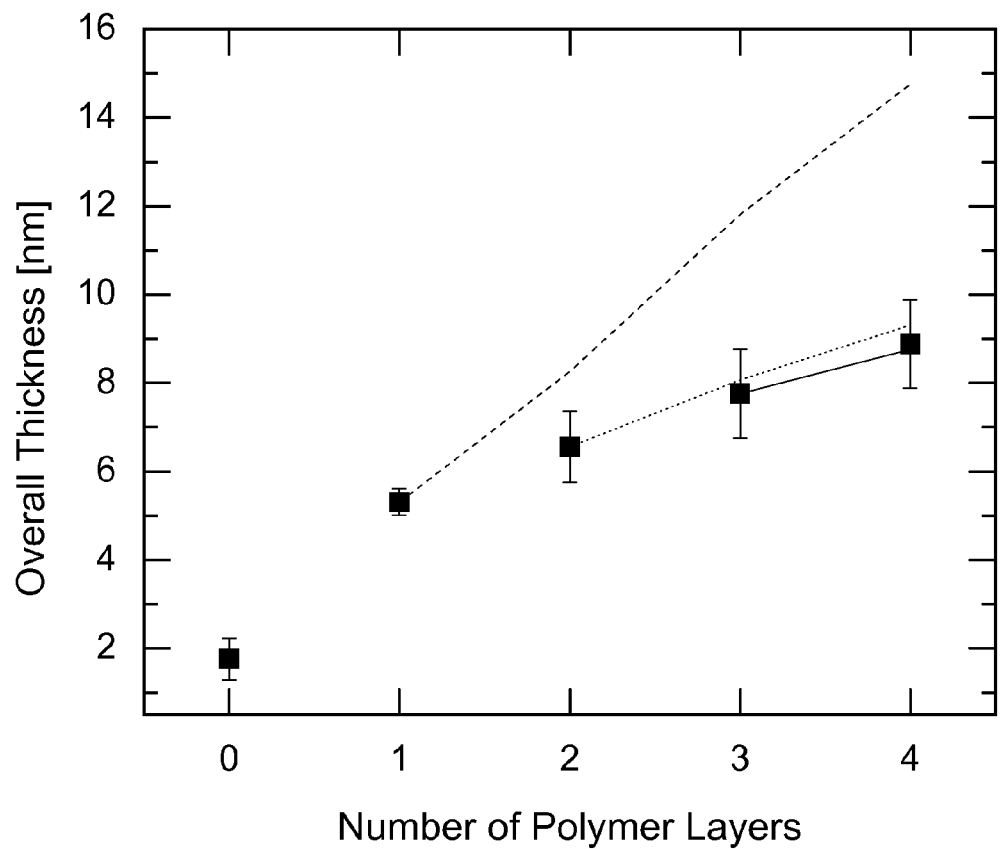
FIG. 5. Ellipsometric thicknesses for alternating covalent layer by layer assembly (ACLbL) films consisting of alternating PS (layers 1 and 3) and PtBA (layers 2 and 4) monomolecular layers. The dashed line shows predictions based upon the areal density of functional groups in the first layer, the dotted line show predictions based upon the second layer and the solid line show predictions based upon the third layer.

FIG. 5 presents thickness data for these alternating monomolecular layer structures. Once the first monomolecular layer is deposited onto the functional substrate, subsequent monomolecular layers show a linear increase in thickness as the number of monomolecular layers is increased. The resultant thin films are dense, segmented block copolymer brushes consisting of alternating sequences of PS and PtBA.

The dashed line in FIG. 5 shows the thicknesses predicted from the areal density of functional groups in the first polymer monomolecular layer based upon application of equations (1) and (2), the dotted line illustrates predictions based upon the areal density of functional groups in the second polymer monomolecular layer and the solid line gives the prediction based upon the areal density of functional groups in the third polymer monomolecular layer. As was seen for the PS multilayers, the conversion of the second monomolecular layer is not complete, but permits prediction of the thicknesses of subsequent monomolecular layers from the known molecular weight of the polymer and the areal density of the preceding monomolecular layer. This observation indicates that after deposition of the second monomolecular layer, the conversion of the interfacial reactions for subsequent monomolecular layers can be nearly complete.

Figure 6:
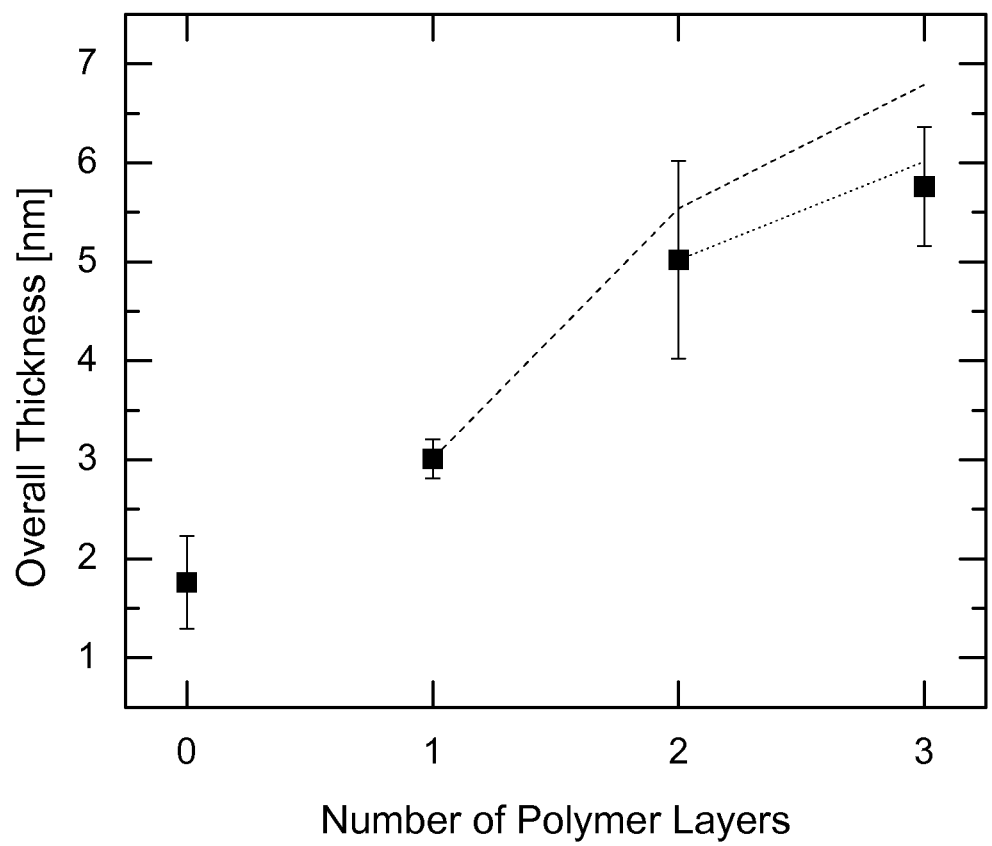
FIG. 6. Ellipsometric thicknesses for ACLbL films consisting of alternating PS (layers 1 and 3) and poly(methyl methacrylate) (PMMA) (layers 2 and 4) monomolecular layers. The dashed line shows predictions based upon the areal density of functional groups in the first layer and the dotted line show predictions based upon the second layer.

The ellipsometric thicknesses for CLbL films comprising alternating monomolecular layers of TMS-alkyne-PS—$N_3$ and TMS-alkyne-PMMA-$N_3$ are shown in FIG. 6. The same general behavior is again realized. Alternating monomolecular layers can be successfully deposited, but the conversion upon addition of the second monomolecular layer is again less than complete. The thickness of the third polymer monomolecular layer, however, can again be predicted quantitatively from the known polymer molecular weight and the areal density of monomolecular layer 2 calculated according to equations (1) and (2), assuming that the interfacial reaction goes to completion.

Implications for the Construction of Multilayer Films by CLbL

The CLbL process can be simple and versatile. Two steps are involved with each deposition cycle: an interfacial click reaction and deprotection of the silane protected alkyne end group. Note that while thermal initiation is used in the methods of the invention, layer by layer assembly by copper catalyzed solution phase click reactions can also be performed with the methods of the invention. Deposition (i.e., reaction) from solution, can be complicated by the effect of the solvent on polymer chain dimensions as well as the propensity for the reacting polymer to physisorb at the surface (Jones et al, Polymer 40, 525-530 (1999); Karim et al, J. Phys. II 5, 1441-1456 (1995); Ligoure and Leibler, J. Phys. (Paris) 51, 1313-1328 (1990)). For example, the rates of interfacial reactions can increase by several orders of magnitude when the polymer in solution physisorbs at the surface (Huang et al, Macromolecules 37, 516-523 (2004)). Effecting the click reaction in the melt state is not subject to solvent effects; the thin film or reactive polymer can be deposited by a simple spin coating process.

Because the interfacial reaction is orthogonal to other chemistries, virtually any type of polymer backbone (e.g., charged or functional) can be employed using click chemistry in CLbL assembly. While the CLbL method was illustrated herein for PS, PtBA, and PMMA monomolecular layers, ATRP is capable of producing HetBi polymers from a wide variety of monomers. Any of these can be employed in the CLbL technique. There are several other general advantages associated with CLbL assembly compared to previously reported LbL assembly processes: in CLbL the film thickness is built up more rapidly, a film thickness of ca. 10 nm can be built up in 4-5 deposition cycles whereas 30-40 cycles might be required in LbL to achieve the same thickness; alternating monomolecular layers of complementary functional polymers are not required in CLbL because both reacting functional groups are present on every polymer chain; the nature of the polymer backbone is not restricted in CLbL as it is in ALbL (e.g., polyelectrolytes or hydrogen bonding polymers are required in ALbL); monomolecular layers of many different polymer types may be built up in CLbL in any sequence; and finally, the monomolecular layers are all covalently bonded in CLbL assembly.

Asymmetry in molecular weight can reduce the conversion of the interfacial reaction for linear polymers in the CLbL process because higher molecular weight polymers can have a lower surface areal density of functional groups than lower molecular weight polymers. This complication can be circumvented by the use of non-linear functional materials to increase the areal density of functional groups at an interface of interest. For example, if the areal density of surface functional groups is insufficient to attach a subsequent layer, it can be increased by addition of a layer of click functional dendrimers (Vestberg et al, J. Polym. Sci. Polym. Chem. 45, 2835-2846 (2007); Urbani et al, Macromolecules 41, 76-86 (2008)). Gaining a detailed understanding of the effects of factors such as molecular weight asymmetry and surface curvature on the CLbL process will be the subject of future investigations.

The model polymers are prepared by atom transfer radical polymerization (ATRP) and have the following architectures: α-ω-difunctional (Di).

Synthesis of a Protected Alkyne-Functional Initiator-TMS. In a 100 mL round bottom flask, 3-(trimethylsilyl)propargyl alcohol (5 g, 38.98 mmol), triethylamine ($Et_3N$ 3.93 g, 38.98 mmol) and 50 mL of dry $Et_2O$ were added and stirred in an ice-water bath for 20 min. Bromoisobutyryl bromide (7.8 g, 33.90 mmol) dissolved in 15 mL of dry $Et_2O$ was added drop-wise. After the addition was complete, the reaction was allowed to warm-up to 23° C. and stirring was continued for 24 h. The reaction mixture was poured into ice-water and the organic product was extracted with $CH_2Cl_2$. The organic phase was washed with 100 mL $H_2O$ (2×) and 100 mL brine (2×), and then dried over anhydrous $Na_2SO_4$. The solvent was distilled at 30° C. under reduced pressure on a rotary evaporator to yield a slightly yellow liquid that was purified by vacuum distillation to yield 5.3 g of final product (54%), propanoic acid, 2-bromo-2-methyl-, 3-(trimethylsilyl)-2-propynyl ester), a protected alkyne-functional initiator for atom transfer radical polymerization (ATRP). $^1$H-NMR δ 4.78 (s, 2H, C$\underline{H}_2$), 1.94 (s. 6H, C$\underline{H}_3$), 0.08 (s, 9H, Si(C$\underline{H}_3$)$_3$. $^{13}$C NMR δ 171.77 (C$\underline{C}$(O)O), 90.03 (Si—$\underline{C}$≡C), 98.55 ($\underline{C}$≡C—Si), 55.88 (O$\underline{C}$C(O)), 54.56 ($\underline{C}$(CH$_3$)$_2$), 31.01 (C$\underline{H}_3$), −0.83 (C$\underline{H}_3$Si).

Synthesis of the Polymers

TMS-alkyne-PtBA-Br. The monomer, t-butyl acrylate (tBA) (99+% purity), was passed through a basic $Al_2O_3$ chromatographic column (flash) to remove inhibitor. Monomer (tBA, 2.5 g, 19.53 mmol), solvent (toluene, Acros, 99.8%, 1.5 mL), initiator ((TMS, 13.5 mg, 0.046 mmol), catalyst (CuBr, 8 mg, 0.051 mmol) and N,N,N',N',N'''-pentamethyldiethylenetriamine (99% purity) ligand (PMDETA, 11.1 mg, 0.062 mmol) were weighed directly in a 25-mL Schlenk tube. After three freeze-pump-thaw cycles, the tube was filled with argon, and the reaction mixture was heated to 70° C. in an oil bath. The side arm of the tube was purged with argon for at least 5 minutes before it was opened for samples to be removed at predetermined times with an airtight syringe. Samples were dissolved in CDCl$_3$, and the conversion was measured by $^1$H-NMR. A part of the solution was injected into a Shimazu LC-10AT gel permeation chromatography system (GPC), equipped with a refractive index detector to measure the number-average and weight-average molecular weights relative to PS standards. Molecular weights were corrected for hydrodynamic volume effects by application of a universal calibration using Mark-Houwink-Sakurada parameters (PS: K=1.41 and a=0.7; PtBA: K=0.33 and a=0.8; PMMA: K=1.04 and a=0.697) and the following formula:

$$\log(M) = \frac{1}{1+a}\log\left(\frac{K_{Ref}}{K}\right) + \frac{1+a_{Ref}}{a}\log(M_{Ref}) \quad (1)$$

Once the desired conversion was achieved, the Schlenk tube was removed from the oil bath, allowed to reach room temperature and the polymerization mixture diluted with $CH_2Cl_2$. This solution was passed through a basic alumina flash column, the catalyst-free mixture was collected and solvent was removed under reduced pressure using a rotary evaporator. Polymer was recovered by filtration after precipitation of a concentrated polymer solution in $CH_2Cl_2$ with a MeOH/$H_2O$ mixture (7:3 v/v).

β-Exchange to (TMS-Alkyne-PtBA-$N_3$)

Figure 7:
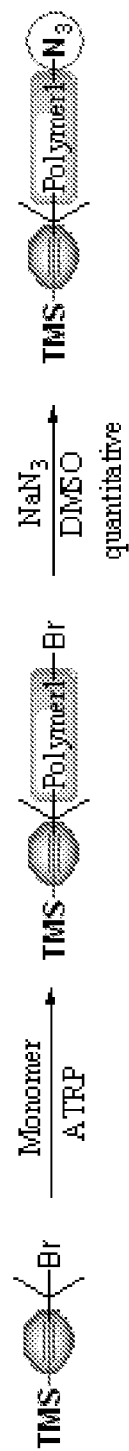
FIG. 7. Schematic illustration showing synthesis of TMS-alkyne-Polymer1-azide according some embodiments of the methods described herein.

1 g of TMS-PtBA-Br polymer was dissolved in 15 mL of dimethyl sulfoxide (DMSO) and 0.5 g of $NaN_3$ was added in a 2-neck round bottom flask equipped with a condenser. The slurry was allowed to stir overnight at refluxing temperature. Product was recovered by subjecting the slurry first to a filtration step to remove the excess $NaN_3$, followed by precipitation in a cooled MeOH/$H_2O$ mixture (7:3 v/v). The collected polymer was re-dissolved in 5 mL $CH_2Cl_2$ and this solution filtered to remove any insoluble solids and re-precipitated in the MeOH/$H_2O$ mixture. The collected polymer was dried and used without further purification. The overall synthesis scheme is depicted in FIG. 7. Similar procedures were used for the synthesis of TMS-PS—$N_3$ and TMS-PMMA-$N_3$. Structures for the 3 polymers are presented in FIG. 8.

Figure 9:
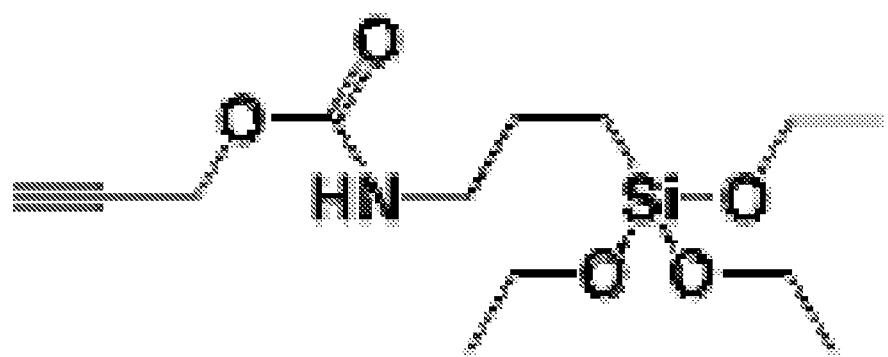
FIG. 9. Structure of alkyne-functional silane.

Substrate Preparation. Glass substrates (cover slips or slides) and Si substrates were cleaned by soaking in $H_2SO_4$ and $H_2O_2$ (3:1 w/w) for 30 min. Si substrates were also cleaned by exposure to UV and ozone for 15 min and then washing extensively with deionized (DI) water. A solution of 50 mg of silane (see FIG. 9) in 1 g of solvent was spin coated on the surface at 2500 RPM for 1 minute and then anneal at 110° C. for 3 hrs under vacuum. The result is a 1.7±0.3 nm thick alkyne silane layer.

Surface Reactivity Study. The α-TMS-alkyne-β-azide-poly(tert-butylacrylate), α-TMS-alkyne-β-azide-poly(polystyrene) and α-TMS-alkyne-β-azide-poly(methylmethacrylate) (shown in FIGS. 8a, 8b & 8c) was coupled to the alkyne surface by click chemistry. The first monomolecular layer of the polymer is spin coated (1000 rpm, 1 min) on top of the functionalized substrate from a solution of 2 mg/ml in toluene. The resulting SiOx/Silane/polymer1 samples were baked at 110° C. for 4-18 hours to facilitate the click reaction. The surface was washed with methanol water and dichloromethane. The alkyne surface is subsequently regenerated by deprotection of the alkyne. In a 20 mL flask, 10 ml $CH_2Cl_2$, 1 mL methanol and 0.23 g of $K_2CO_3$ were mixed. The surface was immersed in this suspension thermostated at room temperature at 50° C.±2 and stirred under Ar overnight. The SiOx/Silane/polymer1 surface is then washed with water, methanol and dichloromethane. This procedure is repeated to make SiOx/Silane/polymer1/polymer2 and then SiOx/Silane/polymer1/polymer2/polymer3.

Characterization. Sessile drop ethylene glycol contact angle measurements were carried out at room temperature for 8-10 μL droplets with a model 100-00 contact angle goniometer (Rame-Hart, Inc.). Reported values are averages of measurements on more than three different samples of more than three different locations on each sample. X-ray photoelectron spectroscopy spectra were recorded with a PHI 5500 spectrometer equipped with a hemispherical electron energy analyzer, a multichannel detector, and an Al KR monochromator X-ray source run at 15 kV and 23.3 mA. The test chamber pressure was maintained below $2\times10^{-9}$ Torr during spectral acquisition. A low-energy electron flood gun was used as required to neutralize surface charging. The X-ray photoelectron spectroscopy (XPS) binding energy (BE) was internally referenced to the aliphatic C1s peak at 284.6 eV. Survey spectra were acquired using an analyzer pass energy of 93.9 eV and a BE resolution of 0.8 eV, while high-resolution spectra were acquired with a pass energy of 23.5 eV and a BE resolution of 0.05 eV. The takeoff angle is defined as the angle between the surface and the photoelectron detector. Angle-dependent XPS (ADXPS) was performed by rotating the sample holder to the desired photoelectron takeoff angle. Spectra were deconvoluted using RBD by fitting a series of Gaussian-Lorentzian functions to each chemically shifted photoelectron peak, after subtracting an appropriate background.

Atomic concentrations were calculated by normalizing peak areas with the elemental sensitivity factor data in the PHI database. The thicknesses of polymer thin films were measured with a Beaglehole spectroscopic and imaging ellipsometer (Beaglehole Instruments, Wellington, New Zealand) under variable angle mode from 65° to 80° with a fixed wavelength of 632.8 nm. The final thickness data were averaged over multiple measurements (greater than five) taken at different locations on different samples. The measured ellipsometry data were analyzed using Film Wizard software. During the optimization to experiment, the thickness of the film was the only parameter adjusted. The optical constants used for the silicon wafer substrate were: n~3.59-3.60, k~0.015-0.025. The optical constants of the polymers were taken as their bulk values and the thickness of the block copolymer was determined using an average refractive index $(1.489^{PMMA}+1.456^{PtBA})/2=1.473$. Optimization of the experiment was regarded as successful when the root-mean-squared error was less than 0.3 and the measured n and k of the polymer films as a function of the angle were in visual agreement with the simulation results.

Figure 11:
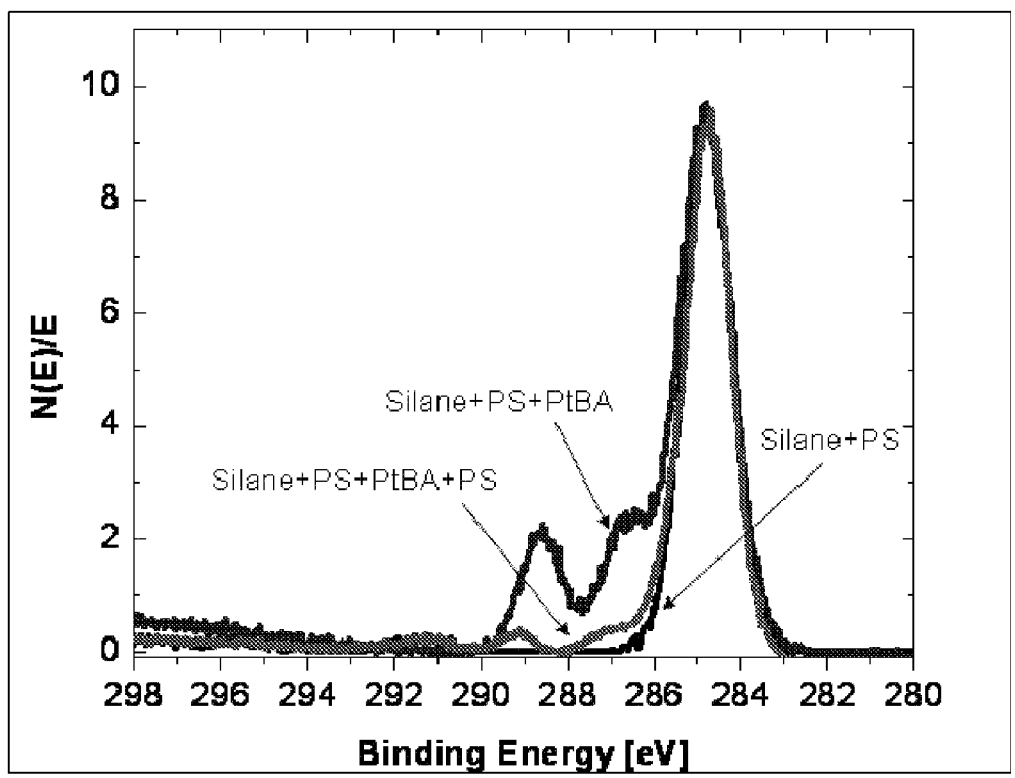
FIG. 11. Deconvolution results for the XPS high resolution C1s spectrum of first layer of PS, second layer of PS-PtBA and third layer of PS-PtBA-PS after click chemistry showing the contribution of each carbon type (TOA=15°).
Figure 12:
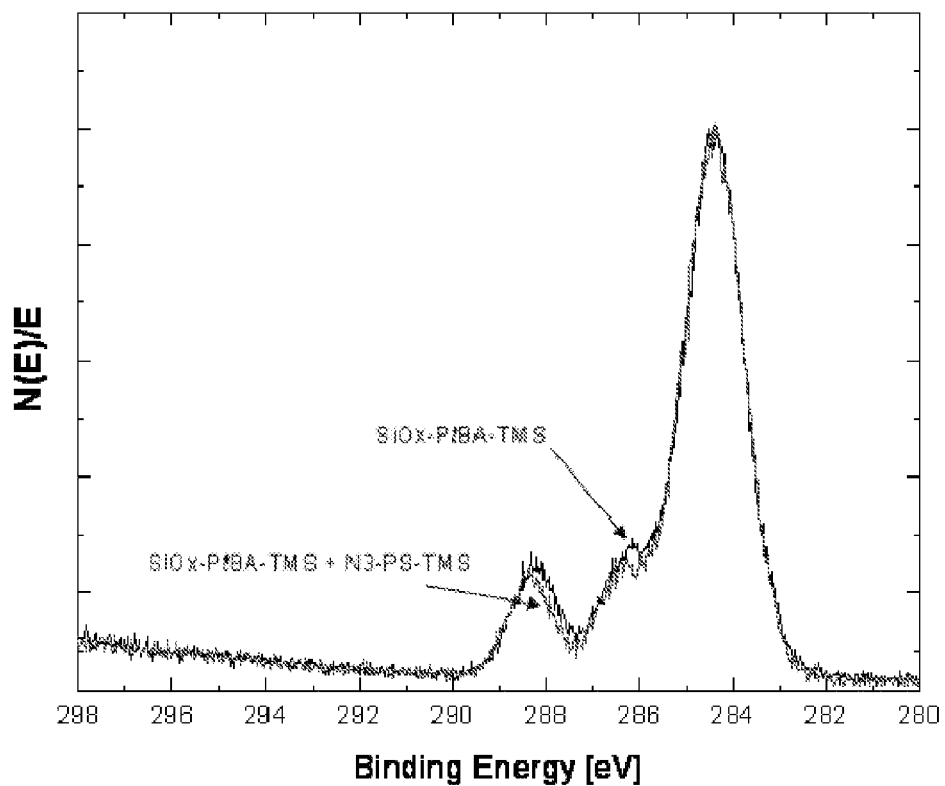
FIG. 12. Control experiment surface layer of PtBA-TMS and reacted with N3-PS-TMS. This figure shows that the protecting group TMS on PtBA is stable on the surface after heating for 18 hours and no reaction occurred.
Figure 14:
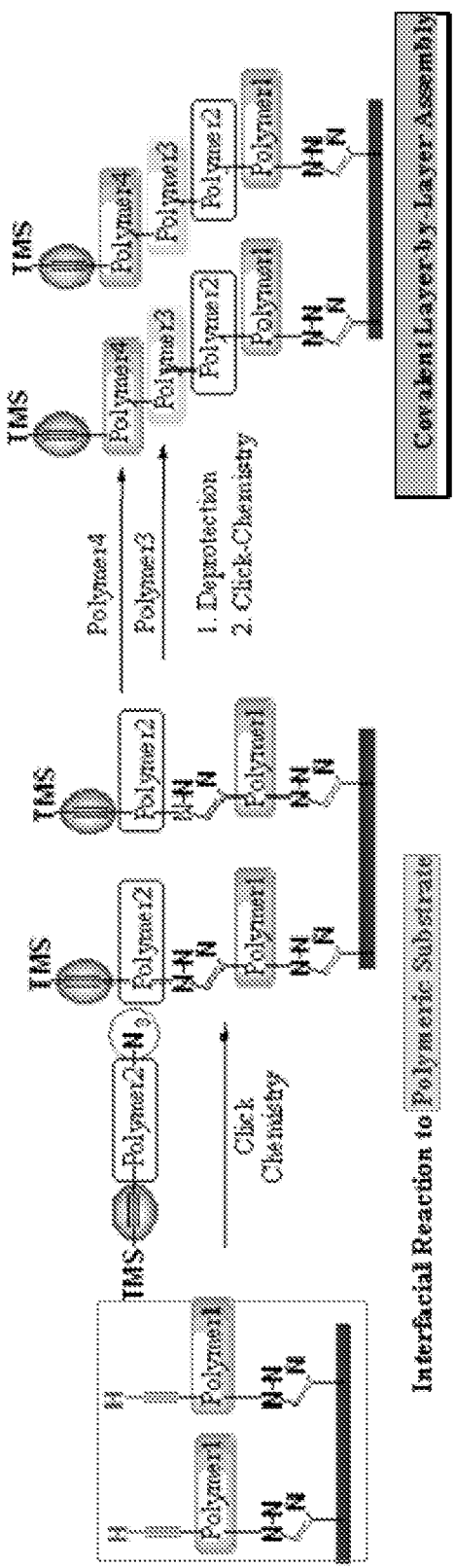
FIG. 14. Hetero bi-functional (HetBi) polymers overcomes problems of stability and efficiency associated with Layer-By-Layer (LBL) assembly techniques where H-bonds or electrostatic interactions are used to create nanostructured polymer films FIG. 15. Successful functionalization of glass surface demonstrated via fluorescence spectroscopy FIG. 16. High-Resolution C(1s) XPS Spectra. PS/PtBA Functionalized Surface FIG. 17. Quantitative Data for 2-Layer Surface.
Figure 16:
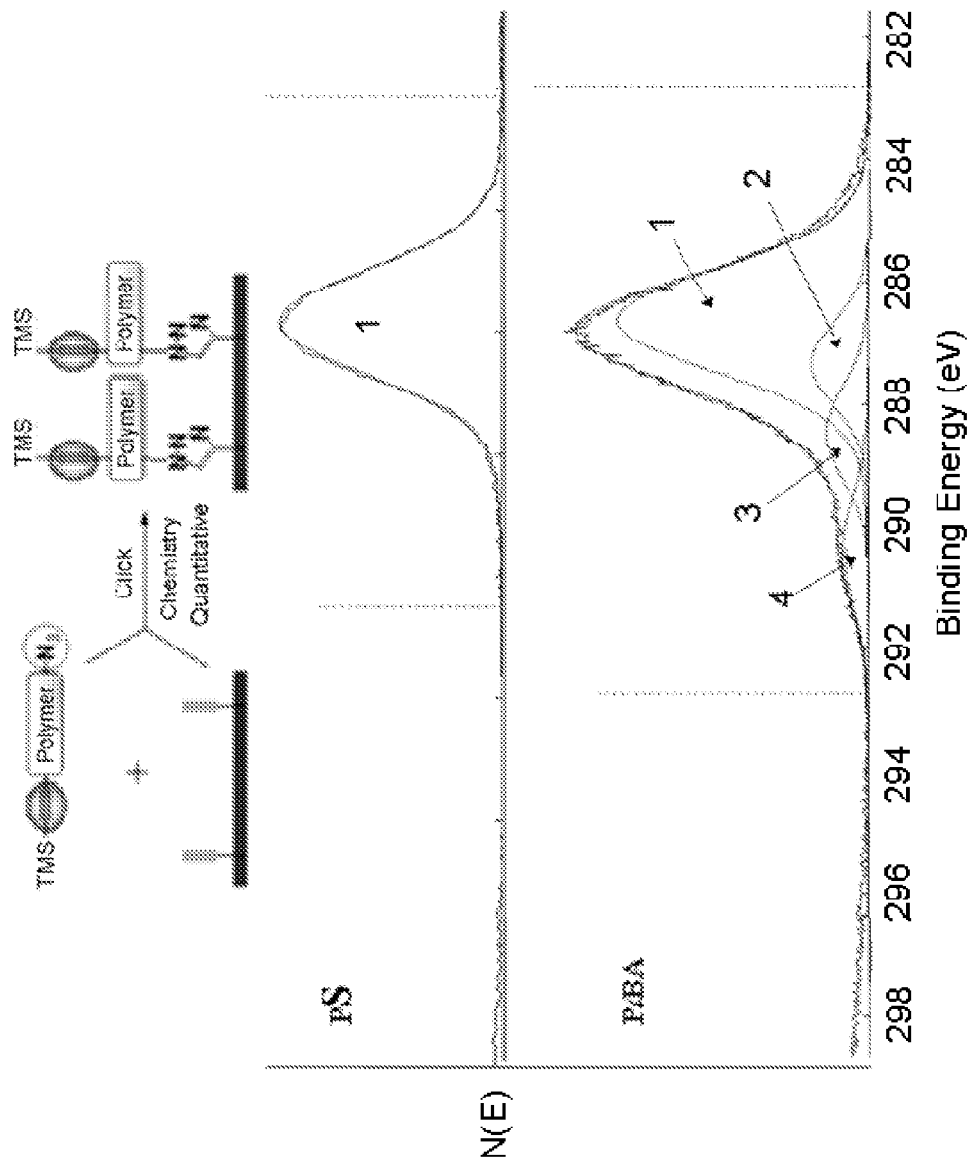
Figure 17:
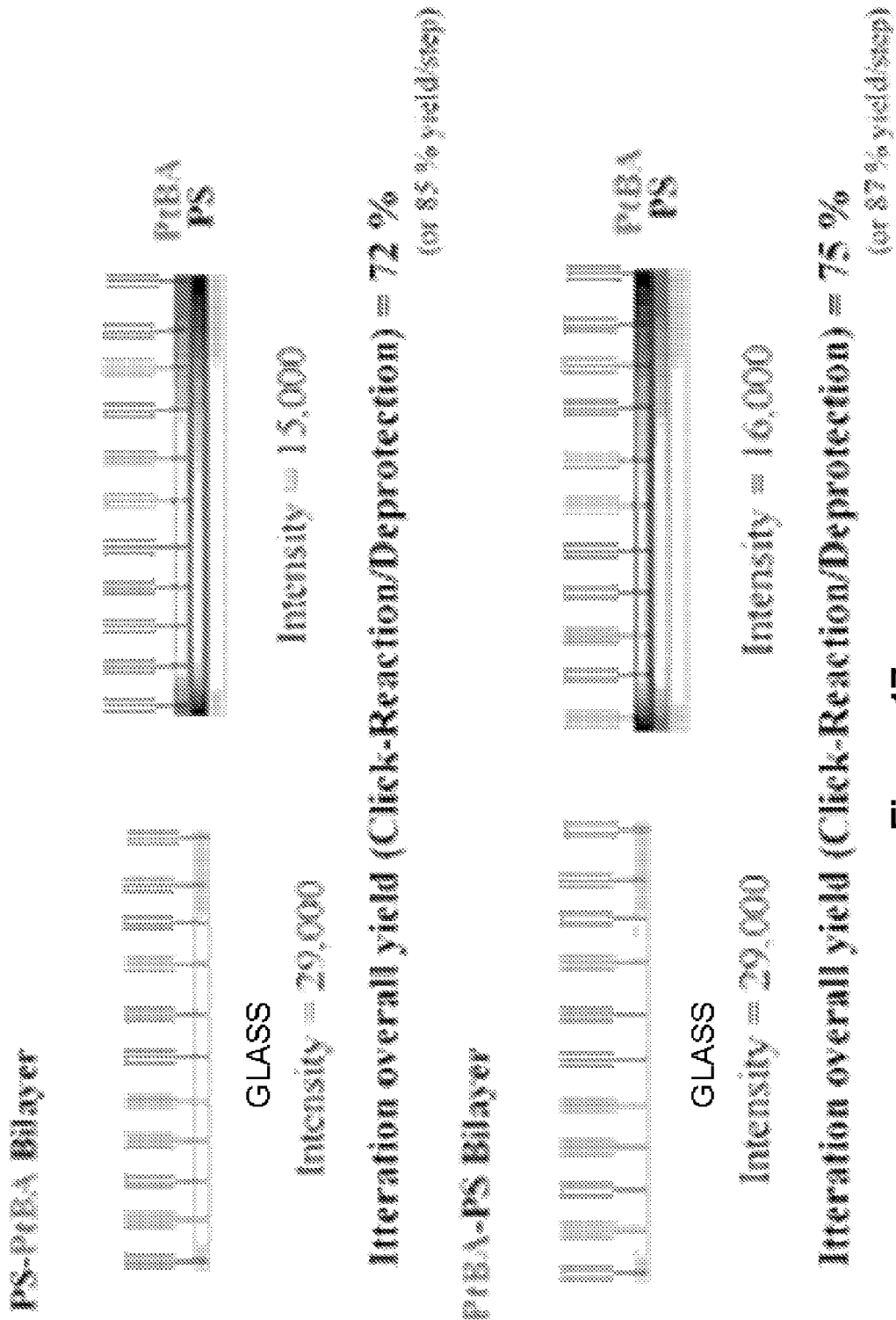
Figure 18:
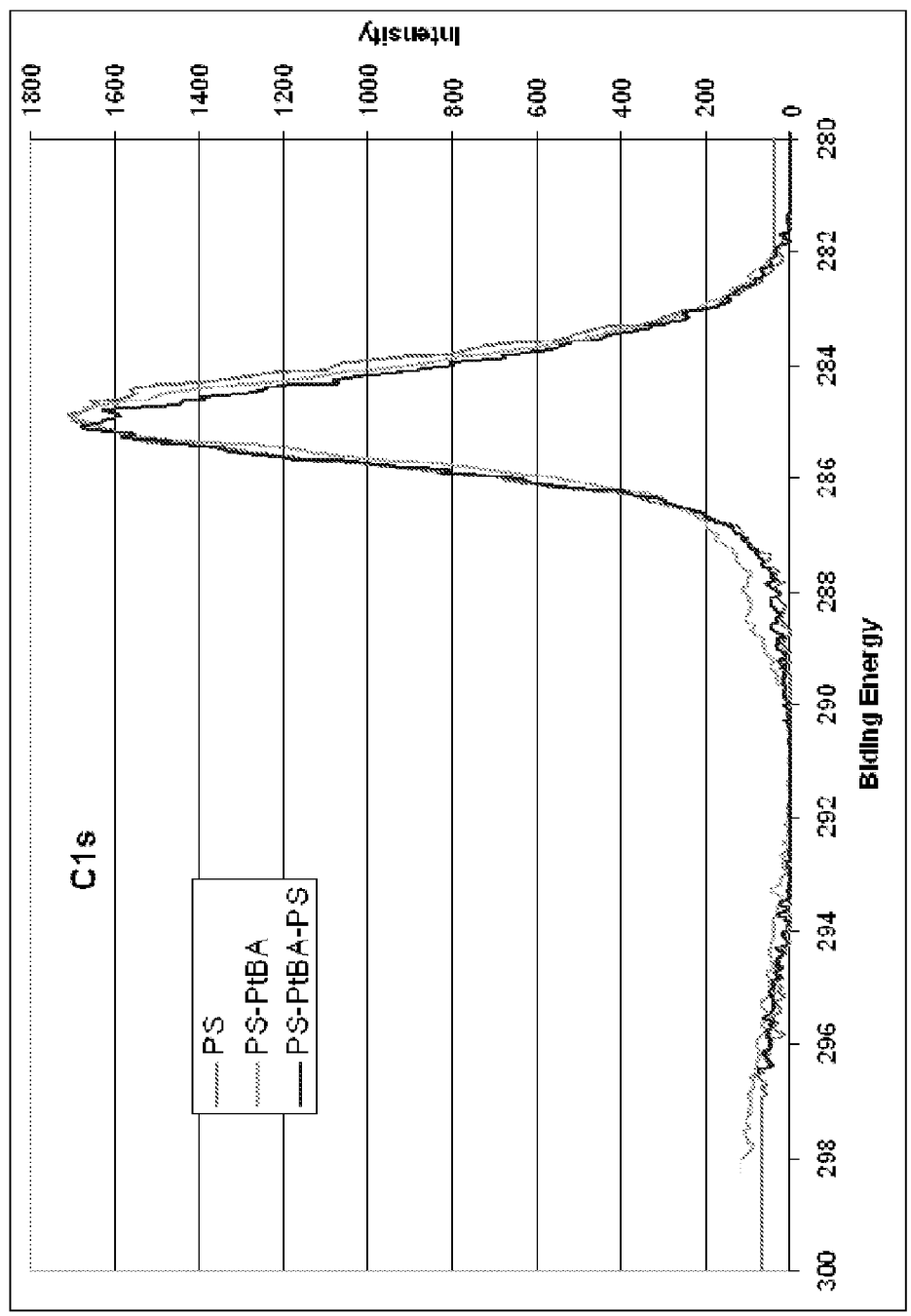
FIG. 18. Qualitative Results for 3 Layer System-XPS of PS-PtBA-PS multilayer functional surface.
Figure 19:
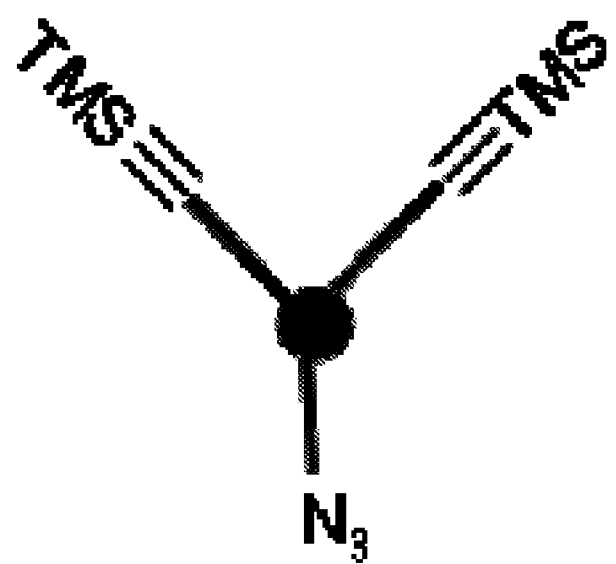
FIG. 19. Schematic illustration of a generic heterotrifunctional molecule in accordance with certain embodiments of the invention described herein.
Figure 20:
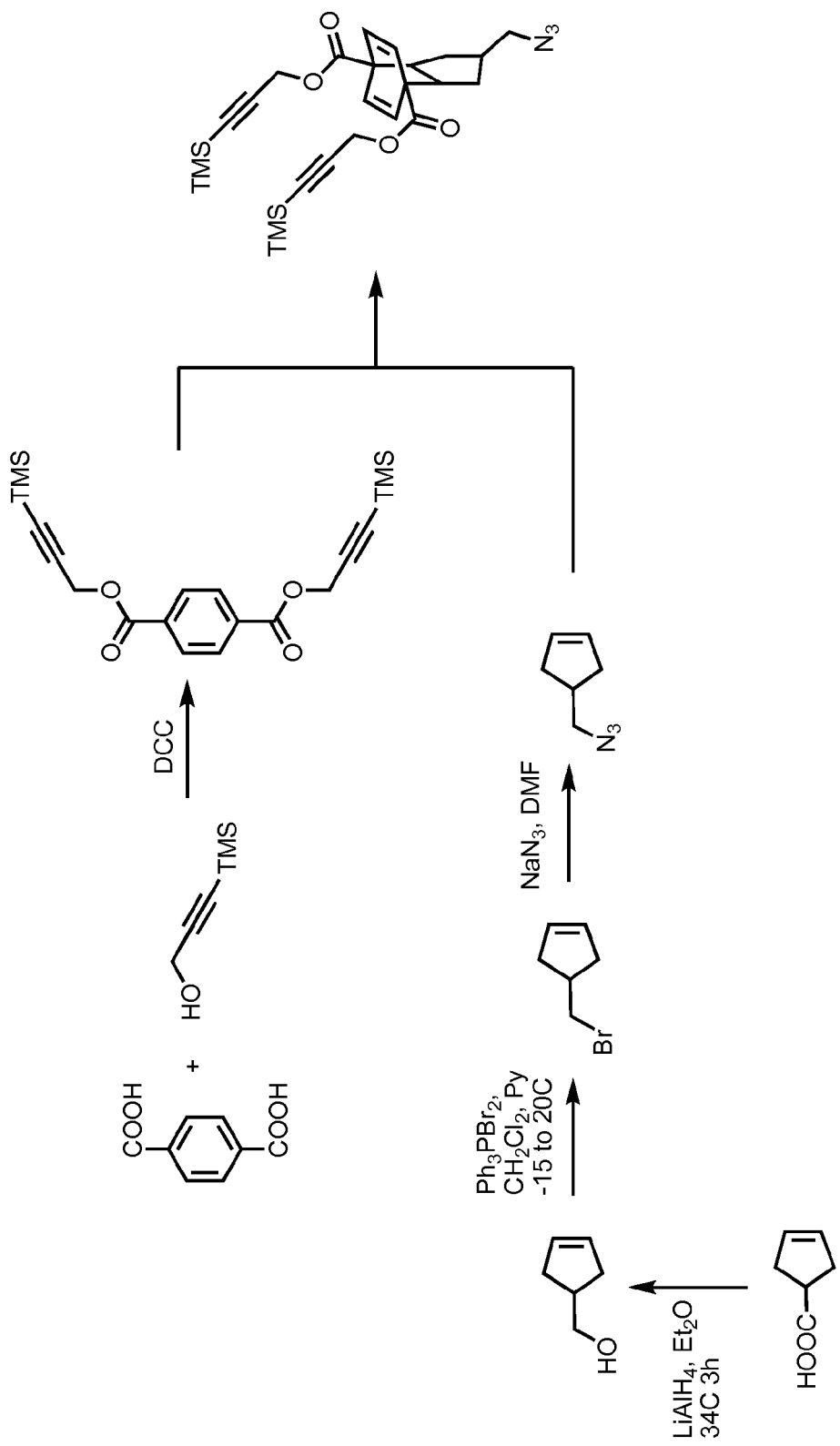
FIG. 20. Schematic illustration showing the synthesis of a heterotrifunctional molecule with two protected trimethyl silane (TMS) groups and one type azide group.
Figure 21:
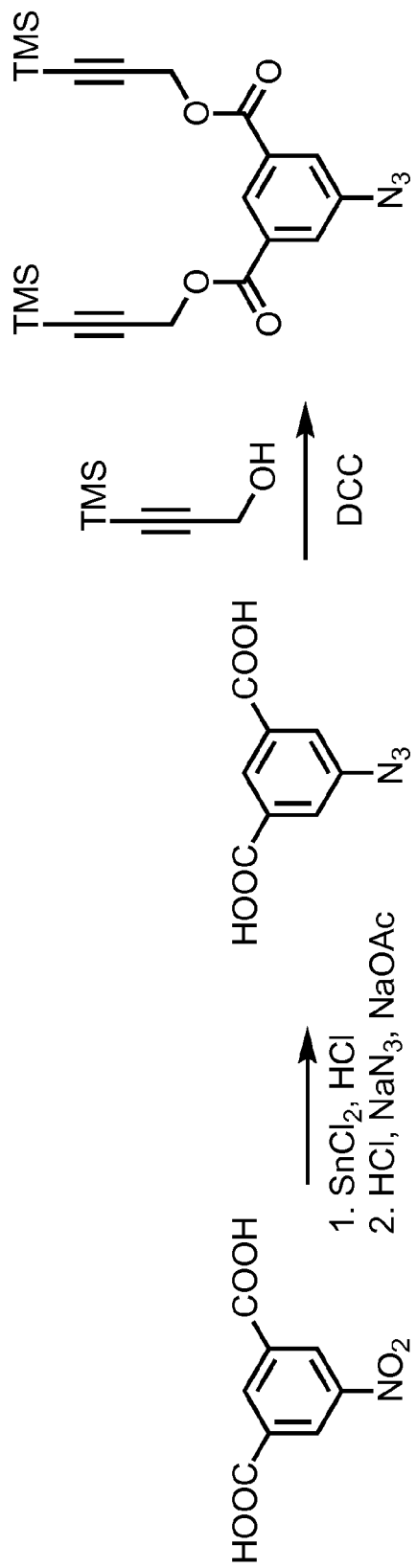
FIG. 21. Schematic illustration showing the synthesis of a heterotrifunctional molecule with two trimethylsilyl (TMS) protecting groups and one type azide group.

FIGS. 10-12 show the deconvolution results for the XPS high resolution C1s spectra of the monomolecular layers before and after click chemistry, and for the control experiment showing the contribution of each carbon type. The measurements were done at take of angle (TOA) 15°. The functional PS brush substrate serves as the model substrate for subsequent click reactions with end-functional polymers as shown in FIG. 7.

Surface Control Experiment. After making the first covalent polymer monomolecular layer of SiOx-Silane-PS-TMS or SiOx-PtBA-TMS, a second monomolecular layer of N3-PtBA-TMS or N3-PS-TMS was spin coated without deprotecting the first monomolecular layer on the surface. No reaction was observed between the azide and the protected alkyne upon heating.

FIGS. 13-18 show the how of HetBi-functional polymers and efficient organic transformations can provide access to stable and reliable functional polymer surfaces for understanding the fundamentals of interfacial reactions. The use of polymer surfaces in the assembly of covalent multi-layer films (LBL Assembly) was investigated. The synthesis of a 3-layer system was accomplished and demonstrated. The polymer surfaces can also be used in conjunction with other biocompatible materials.

REFERENCES

Blodgett, J. Am. Chem. Soc. 56, 495-495 (1934).
Blodgett, Langmuir, Phys. Rev. 51, 964-982 (1937).
Kuhn and Mobius, Angew. Chem. Int. Ed. Engl. 10, 620-637 (1971).
Decher, Science 277, 1232-1237 (1997).
Decher and Hong, Macromol. Chem., Macromol. Symp. 46, 321-327 (1991).
Stroock et al, Langmuir 19, 2466-2472 (2003).
Wang et al, Langmuir 15, 1360-1363 (1999).
Sukhishvili and Granick, Macromolecules 35, 301-310 (2002).
Baur, et al, Adv. Mater. 10, 1452-1455 (1998).
Wells et al, Langmuir 12, 1989-1996 (1996).
Levaesalmi and McCarthy, Macromolecules 30, 1752-1757 (1997).
Heller, Annu Rev. Biomed. Eng. 4, 129-153 (2002).
Liang et al, Adv. Funct. Mater. 16, 542-548 (2006).
Vestberg et al, J. Polym. Sci. Polym. Chem. 45, 2835-2846 (2007).
Urbani et al, Macromolecules 41, 76-86 (2008).
Such et al, J. Am. Chem. Soc. 128, 9318-9319 (2006).
De Greest et al, Macromo. Rapid Comm. 29, 1111-1118 (2008).
Kolb et al, Angew. Chem. 40, 2004-2021 (2001).
Binder and Sachsenhofer, Macromol. Rapid Comm. 28, 15-54 (2007).
Wang and Matyjaszewski. Macromolecules 28, 7901-7910 (1995).
White et al, J. Am. Chem. Soc. 128, 11356-11357 (2006).
Troughtoyt et al, J. Am. Chem. Soc. 111, 321-335 (1989)
Netzer and Sagiv, J. Am. Chem. Soc. 105, 674-676 (1983).
Rengifo et al, Langmuir 24, 7450-7456 (2008).
Chen et al, Biomacromolecules 9, 2345-2352 (2008)
Ulman, Chem. Rev. 96, 1553-1574 (1996)
Dubois and Nuzzo, Annu Rev. Phys. Chem. 43, 437-463 (1992).
Laibinis and Nuzzo, J. Am. Chem. Soc. 113, 7152-7167 (1991).
Senaratne and Andruzzi, C. K. Ober, Biomacromolecules 6, 2427-2448 (2005).
Pantano and Wittberg, Surface and Interfaces Anal. 15, 498-501 (1990).
Dibenedetto, Materials Science and Engineering A302, 74-82 (2001).
Seo et al, J. Org. Chem. 68, 609-612 (2003).
Krivopalov and Shkurko, Russ. Chem. Rev. 74, 339-379 (2005)
Luzinov et al, Macromolecules 33, 1043-1048 (2000).
Jalbert et al, Macromolecules 30, 4481-4490 (1997).
Bates and Frederickson, Physics Today 52, 32-38 (1999).
Jones et al, Polymer 40, 525-530 (1999).
Karim et al, J. Phys. II 5, 1441-1456 (1995).
Ligoure and Leibler, J. Phys. (Paris) 51, 1313-1328 (1990).
Huang et al, Macromolecules 37, 516-523 (2004).
Sun et al, Bioconjugate Chem. 2006, 17, 5257
Such et al, J Am Chem Soc. 2006 Jul. 26; 128(29):9318-9.
Hu et al. Comptes Rendus Chimie 1631-0748 JAN 2006 9 (1)
Mason et al. The Journal of Adhesion (Print) 81:7-87-8, 765-789
Mason, R et al, Journal of Adhesion 2004, vol. 80 (1-2) 119-143

What is claimed is:

1. A method for generating a multilayer polymer composition, the method comprising:
   (a) functionalizing a substrate with a surface group to form a functionalized substrate layer,
   (b) forming a monomolecular layer by contacting the functionalized substrate layer with a hetero-bifunctional polymer comprising a polymer backbone, a click moiety terminus and a protected second click moiety terminus,
   (c) deprotecting the protected second click moiety terminus to form a functionalized monomolecular layer and,
   (d) forming a second monomolecular layer by contacting the functionalized monomolecular layer with a second hetero-bifunctional polymer comprising a polymer backbone, a first click moiety terminus and a protected second click moiety terminus.

2. The method of claim 1, further comprising a step between step (c) and step (d) of forming a functionalized monomolecular layer comprising a heterotrifunctional molecule, the step comprising
   (i) contacting the functionalized monomolecular layer of step (c) with a heterotrifunctional molecule comprising a first click moiety group and at least two protected second click moiety groups, and
   (ii) deprotecting the protected second click moiety groups of the heterotrifunctional molecule to form a functionalized monomolecular layer.

3. The method of claim 1, further comprising a washing step after step (d).

4. A method for generating a multilayer polymer composition, the method comprising:
   (a) functionalizing a substrate with a surface group to form a functionalized substrate layer,
   (b) forming a functionalized monomolecular layer by contacting the functionalized substrate layer with a hetero-bifunctional polymer comprising a polymer backbone, a click moiety terminus and a second click moiety terminus,
   (c) washing the functionalized monomolecular layer,
   (d) forming a second monomolecular layer by contacting the functionalized monomolecular layer with a second hetero-bifunctional polymer comprising a polymer backbone, a first click moiety terminus and a second click moiety terminus.

5. The method of claim 1, further comprising a step between step (c) and step (d) of forming a functionalized monomolecular layer comprising a heterotrifunctional molecule, the step comprising
   (i) contacting the functionalized monomolecular layer of step (c) with a heterotrifunctional molecule comprising a first click moiety group and at least two second click moiety groups, to form a functionalized monomolecular layer.

6. The method of claim 1, further comprising the step of repeating steps (c) to (d) until a multilayer polymer composition having (i) a surface monomolecular layer comprising a surface hetero-bifunctional polymer, and (ii) a desired number of monomolecular layers between the substrate layer and the surface monomolecular layer is obtained.

7. The method of claim 4, further comprising the step of repeating steps (b) to (d) until a multilayer polymer composition having (i) a surface monomolecular layer comprising a surface hetero-bifunctional polymer, and (ii) a desired number of monomolecular layers between the substrate layer and the surface monomolecular layer is obtained.

8. The method of claim 6 or 7, further comprising a step of contacting the functionalized monomolecular layer of step (c) with a molecule having at least a first click moiety terminus and an effector moiety to form a surface effector layer.

9. The method of claim 8, wherein the molecule having at least a first click moiety terminus and an effector moiety to form a surface effector layer is a polymer.

10. The method of claim 1, wherein the heterobifunctional polymer further comprises an effector moiety.

11. The method of claim 10, wherein the effector moiety is a polypeptide, an oligonucleotide, a lipid, a carbohydrate, a small molecule, a drug, a ligand, a catalyst, a dye, a sensor, an analyte or any combination thereof.

12. The method of claim 11, wherein the polypeptide is an enzyme or an antibody.

13. The method of claim 11, wherein the dye is a fluorescent dye.

14. The method of claim 11, wherein the effector moiety is a thermochemically reactive group or a photochemically reactive group.

15. The method of claim 1, wherein the first click moiety terminus is an azide group and the protected second click moiety terminus is a trimethylsilyl alkyne group.

16. The method of claim 2, wherein the first click moiety group of the heterotrifunctional molecule is an azide group and the at least two protected second click moiety groups of the heterotrifunctional molecule are trimethylsilyl alkyne groups.

17. The method of claim 3, wherein the first click moiety terminus is an alkyne group and the second click moiety terminus is an azide group.

18. The method of claim 5, wherein the first click moiety group of the heterotrifunctional molecule is an alkyne group and the at least two second click moiety groups of the heterotrifunctional molecule are azide groups.

19. The method of claim 1, wherein the substrate is a planar surface, a colloidal particle, a nanoparticle, a microparticle, or any combination thereof.

20. The method of claim 1, wherein the substrate comprises glass.

21. The method of claim 1, wherein the substrate comprises a ceramic, a crystal, a silicon, a metal oxide, a metal alloy, gold, quartz, indium tin oxide, antimony tin oxide, a semiconductor, a semiconductor alloy or any combination thereof.

22. The method of claim 1, wherein the substrate is electrically conducting, electrically insulating or semi-conducting.

23. The method of claim 1, wherein the substrate is a carbon nanotube.

24. The method of claim 1, wherein the substrate is a polymer.

25. The method of claim 24, wherein the polymer is a polypeptide, an organic polymer, a polymer precursor, a thermoplastic polymer, a thermosetting polymer, a copolymer, a terpolymer, an oligomer, a homopolymer, a block copolymer, an alternating block copolymer, a random polymer, a random copolymer, a random block copolymer, a graft copolymer, a star block copolymer, a dendrimer or any combination thereof.

26. The method of claim 1, wherein the contacting of the heterobifunctional polymer and the functionalized substrate surface is performed by spin coating, dip coating, spray coating, layer by layer assembly, drop casting, electrostatic painting, or a combination thereof.

27. The method of claim 1, wherein the contacting of the heterobifunctional polymer and the functionalized monomolecular layer is performed by spin coating, dip coating, spray coating, layer by layer assembly, drop casting, electrostatic painting, or a combination thereof.

28. The method of claim 5, wherein the contacting of the heterotrifunctional molecule and the functionalized monomolecular layer is performed by spin coating, dip coating, spray coating, layer by layer assembly, drop casting, electrostatic painting, or a combination thereof.

29. The method of claim 1, wherein the heterobifunctional polymer is a TMS-alkyne-PS-$N_3$, TMS-alkyne-PtBA-$N_3$, or TMS-alkyne-PMMA-$N_3$.

30. The method of claim 1, wherein the polymer backbone is α-trimethylsilyl alkyne-β-azide-poly(styrene), α-trimethylsilyl alkyne-β-azide-poly(tert-butyl acrylate) or α-trimethylsilyl alkyne-β-azide-poly(methyl methacrylate).

31. The method of claim 1, wherein the polymer backbone is a polymer, a blend of polymers, a polymer precursor, a thermoplastic polymer, or a thermosetting polymer.

32. The method of claim 1, wherein the polymer backbone is a copolymer, a homopolymer, a copolymer, a block copolymer, an alternating block copolymer, a random polymer, a random copolymer, a random block copolymer, a dendrimer, or any combination thereof.

33. The method of claim 1, wherein the substrate is glass.

34. The method of claim 1 wherein the substrate comprises silicon, metal oxide, metal alloy, gold, quartz, indium tin oxide materials, antimony tin oxide materials, a semiconductor, a semiconductor alloy, an organic material, polymer or any combination thereof.

35. The method of claim 1, wherein the substrate is a polypeptide or an oligonucleotide.

* * * * *